United States Patent
Liu et al.

(10) Patent No.: US 11,564,181 B2
(45) Date of Patent: Jan. 24, 2023

(54) METHOD AND APPARATUS FOR REPORTING POWER HEADROOM REPORT, AND METHOD AND APPARATUS FOR OBTAINING POWER HEADROOM REPORT

(71) Applicant: HUAWEI TECHNOLOGIES CO., LTD., Guangdong (CN)

(72) Inventors: Zhe Liu, Beijing (CN); Xingwei Zhang, Lund (SE); Chao Li, Beijing (CN); Xiangdong Zhang, Shenzhen (CN); Ronghui Wen, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/243,215

(22) Filed: Apr. 28, 2021

(65) Prior Publication Data

US 2021/0250878 A1  Aug. 12, 2021

Related U.S. Application Data

(63) Continuation of application No. PCT/CN2019/115153, filed on Nov. 1, 2019.

(30) Foreign Application Priority Data

Nov. 2, 2018 (CN) .......................... 201811303742.6

(51) Int. Cl.
  *H04W 52/10* (2009.01)
  *H04W 52/36* (2009.01)

(52) U.S. Cl.
  CPC ......... *H04W 52/365* (2013.01); *H04W 52/10* (2013.01); *H04W 52/367* (2013.01)

(58) Field of Classification Search
  CPC .. H04W 52/365; H04W 52/367; H04W 52/10
  (Continued)

(56) References Cited

U.S. PATENT DOCUMENTS 8,730,829 B2 * 5/2014 Hwang ................... H04L 5/001
                                                                370/252
9,491,721 B1    11/2016 Marupaduga et al.
(Continued)

FOREIGN PATENT DOCUMENTS

CN     103139889 A    6/2013
CN     103781111 A    5/2014
(Continued)

OTHER PUBLICATIONS

Intel Corporation, "Sidelink Power Control for Wearable and IoT Use Cases," 3GPP TSG RAN WG1 Meeting #90, R1-1712520, Prague, Czech Republic, Aug. 21-25, 2017, 5 pages.
(Continued)

*Primary Examiner* — Hai V Nguyen
(74) *Attorney, Agent, or Firm* — Fish & Richardson P.C.

(57) ABSTRACT

Embodiments of this application includes: A first terminal calculates at least one of a first power headroom report (PHR) or a second power headroom report (PHR). The first PHR is a power headroom report of the first terminal on a first transmission link. The second PHR is a total power headroom report of the first terminal on the first transmission link and a second transmission link, the second transmission link is a wireless communication link between the first terminal and a network device, and frequency division multiplexing (FDM) is performed on part of transmission resources on the first transmission link and part of transmission resources on the second transmission link. The first terminal sends the at least one of the first PHR or the second PHR.

20 Claims, 17 Drawing Sheets

(58) Field of Classification Search
USPC .................................................. 455/522, 69
See application file for complete search history.

(56) References Cited

U.S. PATENT DOCUMENTS

| | | | | |
|---|---|---|---|---|
| 10,856,274 | B2* | 12/2020 | Ji | H04W 72/044 |
| 10,856,317 | B2* | 12/2020 | Ma | H04L 27/26025 |
| 11,452,051 | B2* | 9/2022 | Fu | H04W 52/325 |
| 2008/0095263 | A1* | 4/2008 | Xu | H04L 1/0025 375/295 |
| 2014/0321304 | A1* | 10/2014 | Yu | H04W 72/02 370/252 |
| 2016/0037463 | A1* | 2/2016 | Siomina | H04W 52/365 370/330 |
| 2016/0323834 | A1* | 11/2016 | Rahman | H04W 52/34 |
| 2017/0353932 | A1* | 12/2017 | Sorrentino | H04W 52/383 |
| 2017/0374674 | A1 | 12/2017 | Lee et al. | |
| 2018/0124710 | A1* | 5/2018 | Ly | H04W 52/146 |
| 2018/0139773 | A1* | 5/2018 | Ma | H04W 72/1284 |
| 2018/0368081 | A1* | 12/2018 | Akkarakaran | H04W 52/365 |
| 2019/0081753 | A1* | 3/2019 | Jung | H04B 7/063 |
| 2019/0082399 | A1* | 3/2019 | Loehr | H04W 72/14 |
| 2019/0098586 | A1* | 3/2019 | Akkarakaran | H04W 72/1268 |
| 2019/0104477 | A1* | 4/2019 | MolavianJazi | H04W 72/0473 |
| 2019/0159136 | A1* | 5/2019 | MolavianJazi | H04L 5/001 |
| 2019/0246363 | A1* | 8/2019 | Kim | H04W 72/0413 |
| 2019/0364519 | A1* | 11/2019 | Fu | H04W 52/325 |
| 2019/0394732 | A1* | 12/2019 | Loehr | H04L 25/0224 |
| 2020/0053724 | A1* | 2/2020 | MolavianJazi | H04W 52/34 |
| 2020/0053730 | A1* | 2/2020 | Hosseini | H04L 5/0044 |
| 2020/0100194 | A1* | 3/2020 | Nangia | H04W 72/0453 |
| 2020/0288412 | A1* | 9/2020 | Ajdakple | H04W 72/0446 |
| 2020/0336987 | A1* | 10/2020 | Mukherjee | H04W 16/14 |
| 2022/0078812 | A1* | 3/2022 | Fu | H04W 72/1268 |

FOREIGN PATENT DOCUMENTS

| | | |
|---|---|---|
| CN | 105722200 A | 6/2016 |
| CN | 105792096 A | 7/2016 |
| CN | 106575995 A | 4/2017 |
| CN | 107646198 A | 1/2018 |
| EP | 2947930 A1 | 11/2015 |
| EP | 3128782 A1 | 2/2017 |
| WO | 2014089791 A1 | 6/2014 |
| WO | 2018058455 A1 | 4/2018 |

OTHER PUBLICATIONS

Huawei et al., "Summary of AI: 7.2.4.3 Uu-based sidelink resource allocation/configuration," 3GPP TSG RAN WG1 Meeting #94, R1-1809878, Gothenburg, Sweden, Aug. 20-24, 2018, 6 pages.
Catt, "Consideration on Uu MAC due to V2X transmission," 3GPP TSG-RAN WG2 Meeting #103bis, R2-1813730, Chengdu, China, Oct. 8-12, 2018, 4 pages.
Office Action issued in Chinese Application No. 201811303742.6 dated Apr. 29, 2021, 6 pages (with English translation).
Office Action issued in Chinese Application No. 201811303742.6 dated Dec. 3, 2020, 11 pages.
Extended European Search Report issued in European Application No. 19878008.2 dated Dec. 16, 2021, 13 pages.
Huawei et al., "Sidelink physical layer procedures for NR V2X," 3GPP TSG RAN WG1 Meeting #98, R1-1908040, Prague, Czech Republic, Aug. 26-30, 2019, 25 pages.

* cited by examiner

| f0 numerology | f1 numerology | f2 numerology |
|---|---|---|
| Symbol 0 | Symbol 0 | Symbol 0 |
| | | Symbol 1 |
| | Symbol 1 | Symbol 2 |
| | | Symbol 3 |
| symbol 1 | Symbol 2 | Symbol 4 |
| | | Symbol 5 |
| | Symbol 3 | Symbol 6 |
| | | Symbol 7 |
| Symbol 2 | Symbol 4 | Symbol 8 |
| | | Symbol 9 |
| | Symbol 5 | Symbol 10 |
| | | Symbol 11 |
| Symbol 3 | Symbol 6 | Symbol 12 |
| | | Symbol 13 |
| | Symbol 7 | Symbol 14 |
| | | Symbol 15 |
| Symbol 4 | Symbol 8 | Symbol 16 |
| | | Symbol 17 |
| | Symbol 9 | Symbol 18 |
| | | Symbol 19 |

FIG. 4

| C 7 | C 6 | C 5 | C 4 | C 3 | C 2 | C 1 | R |
|---|---|---|---|---|---|---|---|
| C 15 | C 14 | C 13 | C 12 | C 11 | C 10 | C 9 | C 8 |
| C 23 | C 22 | C 21 | C 20 | C 19 | C 18 | C 17 | C 16 |
| C 31 | C 30 | C 29 | C 28 | C 27 | C 26 | C 25 | C 24 |
| P | V | PHR_Uu corresponds to C 1 to C 7 and C 23 to C 31 ||||||
| R | R | Pcmax-Uu ||||||
| P | V | PHR_SL corresponds to C 8 to C 15 ||||||
| R | R | Pcmax-SL ||||||
| P | V | PHR_total corresponds to C 24 to C 29 ||||||
| R | R | Pcmax-total ||||||

...

| P | V | PHR_total corresponds to C n to C |
|---|---|---|
| R | R | Pcmax |

FIG. 13

METHOD AND APPARATUS FOR REPORTING POWER HEADROOM REPORT, AND METHOD AND APPARATUS FOR OBTAINING POWER HEADROOM REPORT

CROSS-REFERENCE TO RELATED APPLICATIONS

This application is a continuation of International Application No. PCT/CN2019/115153, filed on Nov. 1, 2019, which claims priority to Chinese Patent Application No. 201811303742.6, filed on Nov. 2, 2018. The disclosures of the aforementioned applications are hereby incorporated by reference in their entireties.

TECHNICAL FIELD

Embodiments of this application relate to the field of communications technologies, and in particular, to a method and an apparatus for reporting a power headroom report, and a method and an apparatus for obtaining a power headroom report.

BACKGROUND

The 3rd generation partnership project (3GPP) standardizes vehicle-to-everything (V2X) communication in long time evolution (LTE) and new radio (NR) (which may also be referred to as a 5th generation (5G) network). In addition, V2X services are introduced into LTE and NR.

However, a power headroom report (PHR) reporting mechanism is not introduced into an LTE V2X service (which is a V2X service transmitted in LTE) because the LTE V2X service supports only broadcast. An NR V2X service (which is a V2X service transmitted in NR) supports unicast and groupcast, and the NR V2X service has a higher requirement for quality of service (QoS) than the LTE V2X service. A PHR may be used by a network side to learn of power headroom, to facilitate subsequent power adjustment and resource allocation.

The V2X service is transmitted on a sidelink, and the sidelink is a wireless communication link between any two terminals. A sidelink resource for transmitting the V2X service on the sidelink may be allocated by a base station. Currently, at the RAN1 #94 meeting, it is agreed that a sidelink resource and a Uu resource (where the Uu resource is a resource used by a terminal to send data to the base station on a Uu link) may be located on a same carrier, in other words, the sidelink resource and the Uu resource are located on a shared carrier. In addition, the sidelink resource may alternatively be located on a dedicated sidelink carrier.

SUMMARY

Embodiments of the present invention provide a method and an apparatus for reporting a power headroom report, and a method and an apparatus for obtaining a power headroom report, to more properly allocate a sidelink power and resource.

To achieve the foregoing objective, the embodiments of this application provide the following technical solutions:

According to a first aspect, an embodiment of this application provides a method for reporting a power headroom report. The method includes: A first terminal calculates a first power headroom report PHR, where the first PHR is a power headroom report of the first terminal on a first transmission link, and the first transmission link is a wireless communication link between the first terminal and a second terminal. The first terminal sends the first PHR. Alternatively, a first terminal calculates a second power headroom report PHR, where the second PHR is a total power headroom report of the first terminal on a first transmission link and a second transmission link, and the second transmission link is a wireless communication link between the first terminal and a network device. The first terminal sends the second PHR. Alternatively, a first terminal calculates a first PHR and a second PHR, and the first terminal sends the second PHR and the first PHR. Frequency division multiplexing (FDM) is performed on a part of transmission resources of the first transmission link and a part of transmission resources of the second transmission link. The first terminal sends at least one of the first PHR and the second PHR. Certainly, in this embodiment of this application, when the first terminal obtains the first PHR and the second PHR through calculation, the first terminal may alternatively report the at least one of the first PHR and the second PHR.

This embodiment of this application provides the method for reporting a power headroom report. The first terminal calculates the at least one of the first PHR and the second PHR, so that when the first terminal reports the at least one of the first PHR and the second PHR, a receiver can determine the power headroom report on the first transmission link based on the first PHR, and determine the total power headroom report on the first transmission link and the second transmission link based on the second PHR. In this way, when frequency division multiplexing is performed on the part of transmission resources of the first transmission link and the part of transmission resources of the second transmission link, subsequent power adjustment and resource allocation can be facilitated.

In a possible implementation, the second PHR is calculated based on a first maximum transmit power, a transmit power (for example, a first transmit power) of the first terminal on the first transmission link, and a transmit power (for example, a second transmit power) of the first terminal on the second transmission link. In this way, calculation of the second PHR is more convenient and concise.

In a possible implementation, the first maximum transmit power is a maximum transmit power of the first terminal. When frequency division multiplexing FDM is performed on the part of transmission resources of the first transmission link and the part of transmission resources of the second transmission link, a unified maximum transmit power is used as a limitation, so that a factor such as interference can be considered, calculation of the maximum transmit power during frequency division multiplexing is more accurate, calculation of the first maximum transmit power is more concise, and calculation of the second PHR is more concise.

In a possible implementation, the first maximum transmit power is determined based on a maximum transmit power of the first terminal on the first transmission link and a maximum transmit power of the first terminal on the second transmission link. Different maximum transmit powers are used as a limitation for the first transmission link and the second transmission link, and a power and a PHR on the first transmission link and a power and a PHR on the second transmission link are calculated more independently.

In a possible implementation, the second PHR is obtained by subtracting the second transmit power from a difference that is obtained by subtracting the first transmit power from the first maximum transmit power.

In a possible implementation, when the first terminal does not send information on the first transmission link, the first PHR is determined based on a maximum virtual transmit power on the first transmission link and an open-loop power control parameter.

In a possible implementation, when the first terminal does not send information on the first transmission link, the first terminal does not send information on the second transmission link, or the first terminal does not send information on both the first transmission link and the second transmission link, the second PHR is a virtual total PHR In a possible implementation, when the first terminal does not send information on the first transmission link and the first terminal does not send information on the second transmission link, the second PHR is determined based on a first maximum virtual transmit power, a virtual transmit power on the first transmission link, and a virtual transmit power on the second transmission link. The first maximum virtual transmit power is a maximum virtual transmit power of the first terminal, or the first maximum virtual transmit power is determined based on a maximum virtual transmit power of the first terminal on the first transmission link and a maximum virtual transmit power of the first terminal on the second transmission link. In this way, when there is no actual transmission, the receiver can still determine the PHR on the first transmission link and the total PHR on the first transmission link and the second transmission link.

In a possible implementation, when the first terminal does not send information on the first transmission link and the first terminal sends information on the second transmission link, the second PHR is determined based on a first maximum virtual transmit power, a virtual transmit power on the first transmission link, and the second transmit power on the second transmission link.

In a possible implementation, when the first terminal sends information on the first transmission link and the first terminal does not send information on the second transmission link, the second PHR is determined based on a first maximum virtual transmit power, the first transmit power of the first transmission link, and a virtual transmit power of the second transmission link.

In a possible implementation, the method provided in this embodiment of this application further includes: The first terminal receives first signaling, where the first signaling is used to trigger reporting of the at least one of the first PHR and the second PHR; or the first signaling is used to trigger reporting of a third PHR and at least one of the following PHRs: the first PHR and the second PHR, and the third PHR is used to indicate a PHR of the first terminal on the second transmission link. In this way, the first terminal determines, based on triggering of the first signaling, to report the at least one of the first PHR and the second PHR; or report the third PHR and the at least one of the following PHRs: the first PHR and the second PHR.

In a possible implementation, the first signaling is media access control MAC signaling or higher layer signaling.

In a possible implementation, when a preset condition is met, the first terminal determines to report the at least one of the first PHR and the second PHR. Alternatively, the first terminal reports the third PHR and the first PHR. Alternatively, the first terminal reports the third PHR, the first PHR, and the second PHR. Alternatively, the first terminal reports the third PHR and the second PHR. The preset condition includes that a prohibit timer expires and any one of the following: a sidelink resource set is switched, a sidelink resource set is reconfigured, and the first terminal does not use a sidelink maximum transmit power to send information on the first transmission link, where the sidelink resource set is used to transmit information sent on the first transmission link. In this way, the first terminal autonomously determines, based on the preset condition, whether to report the at least one of the first PHR and the second PHR, or the first terminal reports the third PHR and the at least one of the following PHRs: the first PHR and the second PHR. For example, different communication modes have different coverage and different power requirements. The first PHR and the second PHR are reported when the prohibit timer expires and the sidelink resource set is switched and/or the sidelink resource set is reconfigured, so that a transmitter can adjust a power in a timely manner. In addition, PHR reporting is triggered when the prohibit timer expires and transmission is not performed on the sidelink by using the maximum transmit power, and particularity of the power on the first transmission link is considered.

In a possible implementation, that the first terminal sends the at least one of the first PHR and the second PHR includes: The first terminal sends second signaling and third signaling, where the second signaling carries the first PHR and a first identifier used to identify the first PHR and the third signaling carries the second PHR and a second identifier used to identify the second PHR.

In a possible implementation, that the first terminal sends the at least one of the first PHR and the second PHR includes: The first terminal sends fourth signaling, where the fourth signaling includes the first PHR, the second PHR, a first identifier used to identify the first PHR, information about a plurality of time-frequency resources corresponding to the first PHR, a second identifier used to identify the second PHR, and information used to indicate at least one of a plurality of time-frequency resources corresponding to the second PHR.

In a possible implementation, a plurality of PHRs in the first PHR, the second PHR, and the third PHR are triggered, and the first terminal reports a PHR with a high priority in the triggered PHRs based on a priority of the first PHR, a priority of the second PHR and a priority of the third PHR. In this way, the PHR with the high priority may be preferentially reported, so that the receiver preferentially adjusts a power based on the PHR with the high priority.

In a possible implementation, the method provided in this embodiment of this application further includes: When a value of the second PHR is less than or equal to a first threshold, the first terminal reduces a first parameter of the first transmission link, so that frequency division multiplexing FDM is performed on the part of transmission resources of the first transmission link and the part of transmission resources of the second transmission link, where the first parameter is a transmit power or a bandwidth.

In a possible implementation, the method provided in this embodiment of this application further includes: When a value of the second PHR is less than or equal to a first threshold, the first terminal preferentially reduces a first parameter of a transmission link with a low priority based on a priority corresponding to the first transmission link and a priority corresponding to the second transmission link, where the first parameter is a transmit power or a bandwidth. In this way, the first terminal can preferentially reduce the first parameter of the transmission link with the low priority based on the priorities, thereby ensuring a transmit power or a bandwidth of the first transmission link with a high priority.

A bandwidth of a transmission link may be a bandwidth or a quantity of resource blocks (RB) used to transmit information on the transmission link.

For example, the priority corresponding to the first transmission link in this embodiment of this application may be a priority of the first transmission link, or may be a priority of information transmitted on the first transmission link. The priority corresponding to the second transmission link may be a priority of the second transmission link, or may be a priority of information transmitted on the second transmission link.

In a possible implementation, the method provided in this embodiment of this application further includes: When a value of the second PHR is less than or equal to a first threshold, the first terminal discards information sent on the first transmission link or discards information sent on the second transmission link. In this way, when the value of the second PHR is less than or equal to the first threshold, the first terminal chooses to discard information sent on one transmission link, thereby ensuring reliability of information sent on the other transmission link.

In a possible implementation, the first terminal preferentially discards, based on a priority corresponding to the first transmission link and a priority corresponding to the second transmission link, information sent on a transmission link with a low priority. In this way, during frequency division multiplexing, when the second PHR is less than or equal to the first threshold, the first terminal preferentially discards information with a low priority, thereby ensuring reliability of information with a high priority.

In a possible implementation, a priority of a transmission link is determined based on a priority parameter defined in quality of service QoS.

According to a second aspect, an embodiment of this application provides a method for receiving a power headroom report. The method includes: A network device receives at least one of a first PHR and a second PHR from a first terminal. The first PHR is a power headroom report of the first terminal on a first transmission link, and the first transmission link is a wireless communication link between the first terminal and a second terminal. The second PHR is a total power headroom report of the first terminal on the first transmission link and a second transmission link, the second transmission link is a wireless communication link between the first terminal and the network device, and frequency division multiplexing FDM is performed on a part of transmission resources of the first transmission link and a part of transmission resources of the second transmission link.

In a possible implementation, the second PHR is determined based on a first maximum transmit power, a first transmit power, and a second transmit power, the first transmit power is a transmit power of the first terminal on the first transmission link, and the second transmit power is a transmit power of the first terminal on the second transmission link.

In a possible implementation, the first maximum transmit power is a maximum transmit power of the first terminal. Alternatively, the first maximum transmit power is determined based on a maximum transmit power of the first terminal on the first transmission link and a maximum transmit power of the first terminal on the second transmission link.

In a possible implementation, the second PHR is obtained by subtracting the first transmit power and the second transmit power from the first maximum transmit power.

In a possible implementation, before that a network device receives at least one of a first PHR and a second PHR from a first terminal, the method provided in the foregoing aspect further includes: The network device sends first signaling to the first terminal, where the first signaling is used to trigger reporting of the at least one of the first PHR and the second PHR; or the first signaling is used to trigger reporting of a third PHR and at least one of the following PHRs: the first PHR and the second PHR, and the third PHR is used to indicate a PHR of the first terminal on the second transmission link. In this way, the first terminal determines, based on triggering of the first signaling, to report the at least one of the first PHR and the second PHR; or report the third PHR and the at least one of the following PHRs: the first PHR and the second PHR.

According to a third aspect, an embodiment of this application provides an apparatus for reporting a PHR. The apparatus for reporting a PHR can implement the method for reporting a PHR in any one of the first aspect or the possible implementations of the first aspect, and therefore can also achieve beneficial effects in any one of the first aspect or the possible implementations of the first aspect. The apparatus for reporting a PHR may be a first terminal, or may be an apparatus for reporting a PHR that can support a first terminal in implementing any one of the first aspect or the possible implementations of the first aspect, for example, a chip used in the first terminal. The apparatus for reporting a PHR can implement the foregoing method by using software, hardware, or hardware executing corresponding software.

In an example, an apparatus for reporting a PHR includes: a processing unit, configured to calculate a first power headroom report PHR, where the first PHR is a power headroom report of the first terminal on a first transmission link, and the first transmission link is a wireless communication link between the first terminal and a second terminal; and a sending unit, configured to send the first PHR; a processing unit, configured to calculate a second power headroom report PHR, where the second PHR is a total power headroom report of the first terminal on a first transmission link and a second transmission link, and the second transmission link is a wireless communication link between the first terminal and a network device; and a sending unit, configured to send the second PHR; or a processing unit, configured to calculate a first PHR and a second PHR, and a sending unit, configured to send the second PHR and the first PHR. Frequency division multiplexing FDM is performed on a part of transmission resources of the first transmission link and a part of transmission resources of the second transmission link. The first terminal sends at least one of the first PHR and the second PHR. Certainly, in this embodiment of this application, when the first terminal obtains the first PHR and the second PHR through calculation, the first terminal may alternatively report the at least one of the first PHR and the second PHR.

In a possible implementation, the second PHR is calculated based on a first maximum transmit power, a transmit power (for example, a first transmit power) of the first terminal on the first transmission link, and a transmit power (for example, a second transmit power) of the first terminal on the second transmission link.

In a possible implementation, the first maximum transmit power is a maximum transmit power of the first terminal.

In a possible implementation, the first maximum transmit power is determined based on a maximum transmit power of the first terminal on the first transmission link and a maximum transmit power of the first terminal on the second transmission link.

In a possible implementation, the second PHR is obtained by subtracting the second transmit power from a difference that is obtained by subtracting the first transmit power from the first maximum transmit power.

In a possible implementation, when the first terminal does not send information on the first transmission link, the processing unit is specifically configured to determine the first PHR based on a maximum virtual transmit power on the first transmission link and an open-loop power control parameter.

In a possible implementation, when the first terminal does not send information on the first transmission link, the first terminal does not send information on the second transmission link, or the first terminal does not send information on both the first transmission link and the second transmission link, the second PHR is a virtual total PHR.

In a possible implementation, when the first terminal does not send information on the first transmission link and the first terminal does not send information on the second transmission link, the second PHR is determined based on a first maximum virtual transmit power, a virtual transmit power on the first transmission link, and a virtual transmit power on the second transmission link. The first maximum virtual transmit power is a maximum virtual transmit power of the first terminal, or the first maximum virtual transmit power is determined based on a maximum virtual transmit power of the first terminal on the first transmission link and a maximum virtual transmit power of the first terminal on the second transmission link. In this way, when there is no actual transmission, the receiver can still determine the PHR on the first transmission link and the total PHR on the first transmission link and the second transmission link.

In a possible implementation, when the first terminal does not send information on the first transmission link and the first terminal sends information on the second transmission link, the second PHR is determined based on a first maximum virtual transmit power, a virtual transmit power on the first transmission link, and the second transmit power on the second transmission link.

In a possible implementation, when the first terminal sends information on the first transmission link and the first terminal does not send information on the second transmission link, the second PHR is determined based on a first maximum virtual transmit power, the first transmit power of the first transmission link, and a virtual transmit power of the second transmission link.

In a possible implementation, the apparatus provided in this embodiment of this application further includes: a receiving unit, configured to receive first signaling, where the first signaling is used to trigger reporting of the at least one of the first PHR and the second PHR. Alternatively, the first signaling is used to trigger reporting of a third PHR and at least one of the following PHRs: the first PHR and the second PHR, and the third PHR is a PHR of the first terminal on the second transmission link.

In a possible implementation, the first signaling is media access control MAC signaling or higher layer signaling.

In a possible implementation, the sending unit is specifically configured to: when a preset condition is met, determine to report the at least one of the first PHR and the second PHR. Alternatively, the sending unit is specifically configured to: when a preset condition is met, report the third PHR and the first PHR. Alternatively, the sending unit is specifically configured to: when a preset condition is met, report the third PHR, the first PHR, and the second PHR. Alternatively, the sending unit is specifically configured to: when a preset condition is met, report the third PHR and the second PHR. The preset condition includes that a prohibit timer expires and any one of the following: a sidelink resource set is switched, a sidelink resource set is reconfigured, and the first terminal does not use a sidelink maximum transmit power to send information on the first transmission link, where the sidelink resource set is used to transmit information sent on the first transmission link.

In a possible implementation, the sending unit is specifically configured to send second signaling and third signaling, where the second signaling carries the first PHR and a first identifier used to identify the first PHR, and the third signaling carries the second PHR and a second identifier used to identify the second PHR.

In a possible implementation, the sending unit is specifically configured to send fourth signaling, where the fourth signaling includes the first PHR, the second PHR, a first identifier used to identify the first PHR, information about a plurality of time-frequency resources corresponding to the first PHR, a second identifier used to identify the second PHR, and information used to indicate at least one of a plurality of time-frequency resources corresponding to the second PHR.

In a possible implementation, a plurality of PHRs in the first PHR, the second PHR, and the third PHR are triggered, and the sending unit is specifically configured to report a PHR with a high priority in the triggered PHRs based on a priority of the first PHR, a priority of the second PHR, and a priority of the third PHR.

In a possible implementation, the apparatus provided in this embodiment of this application further includes: the processing unit, configured to: when a value of the second PHR is less than or equal to a first threshold, reduce a first parameter of the first transmission link, so that frequency division multiplexing FDM is performed on the part of transmission resources of the first transmission link and the part of transmission resources of the second transmission link, where the first parameter is a transmit power or a bandwidth.

In a possible implementation, the processing unit is configured to: when a value of the second PHR is less than or equal to a first threshold, preferentially reduce a first parameter of a transmission link with a low priority based on a priority corresponding to the first transmission link and a priority corresponding to the second transmission link, where the first parameter is a transmit power or a bandwidth.

In a possible implementation, the processing unit is configured to: when a value of the second PHR is less than or equal to a first threshold, discard information sent on the first transmission link or discard information sent on the second transmission link.

In a possible implementation, the processing unit is configured to: when a value of the second PHR is less than or equal to a first threshold, preferentially discard, based on a priority corresponding to the first transmission link and a priority corresponding to the second transmission link, information sent on a transmission link with a low priority.

In a possible implementation, a priority of a transmission link is determined based on a priority parameter defined in quality of service QoS.

In another example, an embodiment of this application further provides an apparatus for reporting a PHR. The apparatus for reporting a PHR may be a first terminal or a chip used in a first terminal. The apparatus for reporting a PHR includes an interface circuit and one or more processors.

The first terminal communicates with another device by using the interface circuit. When the one or more processors execute instructions, the first terminal performs the method for reporting a PHR in the first aspect.

For example, the interface circuit is configured to support the apparatus for reporting a PHR in performing steps of receiving and sending a message/data on a side of the apparatus for reporting a PHR in any one of the first aspect or the possible implementations of the first aspect. The processor is configured to support the apparatus for reporting a PHR in performing a step of processing message/data on the side of the apparatus for reporting a PHR in any one of the first aspect or the possible implementations of the first aspect. For specific corresponding steps, refer to the descriptions in any one of the first aspect or the possible implementations of the first aspect. Details are not described herein again.

Optionally, the interface circuit and the processor that are in the apparatus for reporting a PHR are coupled to each other.

Optionally, the apparatus for reporting a PHR may further include a memory, configured to store computer program code, where the computer program code includes instructions. Optionally, the processor, the interface circuit, and the memory are coupled to each other.

According to a fourth aspect, an embodiment of this application provides an apparatus for obtaining a PHR. The apparatus for obtaining a PHR can implement the method for obtaining a PHR in any one of the second aspect or the possible implementations of the second aspect, and therefore can also achieve beneficial effects in any one of the second aspect or the possible implementations of the second aspect. The apparatus for obtaining a PHR may be a network device, or may be an apparatus for obtaining a PHR that can support a network device in implementing any one of the second aspect or the possible implementations of the second aspect, for example, a chip used in the network device. The apparatus for obtaining a PHR can implement the foregoing method by using software, hardware, or hardware executing corresponding software.

In an example, the apparatus for obtaining a PHR includes: a receiving unit, configured to receive at least one of a first PHR and a second PHR from a first terminal. The first PHR is a power headroom report of the first terminal on a first transmission link, and the first transmission link is a wireless communication link between the first terminal and a second terminal. The second PHR is a total power headroom report of the first terminal on the first transmission link and a second transmission link, the second transmission link is a wireless communication link between the first terminal and the network device, and frequency division multiplexing FDM is performed on a part of transmission resources of the first transmission link and a part of transmission resources of the second transmission link.

Optionally, the apparatus may further include: a processing unit, configured to adjust resource allocation based on the at least one of the first PHR and the second PHR.

In a possible implementation, the second PHR is determined based on a first maximum transmit power, a first transmit power, and a second transmit power, the first transmit power is a transmit power of the first terminal on the first transmission link, and the second transmit power is a transmit power of the first terminal on the second transmission link.

In a possible implementation, the first maximum transmit power is a maximum transmit power of the first terminal; or the first maximum transmit power is determined based on a maximum transmit power of the first terminal on the first transmission link and a maximum transmit power of the first terminal on the second transmission link.

In a possible implementation, the second PHR is obtained by subtracting the first transmit power and the second transmit power from the first maximum transmit power.

In a possible implementation, before the network device receives the at least one of the first PHR and the second PHR from the first terminal, the sending unit is further configured to send first signaling to the first terminal, where the first signaling is used to trigger reporting of the at least one of the first PHR and the second PHR; or the first signaling is used to trigger reporting of a third PHR and at least one of the following PHRs: the first PHR and the second PHR, and the third PHR is used to indicate a PHR of the first terminal on the second transmission link. In this way, the first terminal determines, based on triggering of the first signaling, to report the at least one of the first PHR and the second PHR; or report the third PHR and the at least one of the following PHRs: the first PHR and the second PHR In another example, an embodiment of this application further provides an apparatus for obtaining a PHR. The apparatus for obtaining a PHR may be a network device or a chip used in a network device. The apparatus for obtaining a PHR includes one or more processors and an interface circuit.

The network device communicates with another device by using the interface circuit. When the one or more processors execute instructions, the network device performs the method for obtaining a PHR in the second aspect.

For example, the interface circuit is configured to support the apparatus for obtaining a PHR in performing steps of receiving and sending a message/data on a side of the apparatus for obtaining a PHR in any one of the second aspect or the possible implementations of the second aspect. The processor is configured to support the apparatus for obtaining a PHR in performing a step of processing a message/data on the side of the apparatus for obtaining a PHR in any one of the second aspect or the possible implementations of the second aspect. For specific corresponding steps, refer to the descriptions in any one of the second aspect or the possible implementations of the second aspect. Details are not described herein again.

Optionally, the interface circuit and the processor that are in the apparatus for obtaining a PHR are coupled to each other.

Optionally, the apparatus for obtaining a PHR may further include a memory, configured to store computer program code, where the computer program code includes instructions. Optionally, the processor, the interface circuit, and the memory are coupled to each other.

According to a fifth aspect, an embodiment of this application provides a computer-readable storage medium. The computer-readable storage medium stores instructions. When the instructions are run on a computer, the computer is enabled to perform the method for reporting a PHR in the first aspect or the possible implementations of the first aspect.

According to a sixth aspect, this application provides a computer-readable storage medium. The computer-readable storage medium stores instructions. When the instructions are run on a computer, the computer is enabled to perform the method for obtaining a PHR in the second aspect or the possible implementations of the second aspect.

According to a seventh aspect, this application provides a computer program product including instructions. When the instructions are run on a computer, the computer is enabled to perform the method for reporting a PHR in the first aspect or the possible implementations of the first aspect.

According to an eighth aspect, this application provides a computer program product including instructions. When the instructions are run on a computer, the computer is enabled to perform the method for obtaining a PHR in the second aspect or the possible implementations of the second aspect.

According to a ninth aspect, an embodiment of this application provides a chip. The chip includes a processor and an interface circuit. The interface circuit is coupled to the processor, and the processor is configured to run a computer program or instructions, to implement the method for reporting a PHR in the first aspect or the possible implementations of the first aspect. The interface circuit is configured to communicate with a module other than the chip.

According to a tenth aspect, an embodiment of this application provides a chip. The chip includes a processor and an interface circuit. The interface circuit is coupled to the processor, and the processor is configured to run a computer program or instructions, to implement the method for obtaining a PHR in the second aspect or the possible implementations of the second aspect. The interface circuit is configured to communicate with a module other than the chip.

For beneficial effects of the second aspect, the third aspect, the fourth aspect, the fifth aspect, the sixth aspect, the seventh aspect, the eighth aspect, the ninth aspect, and the tenth aspect, and the implementations of the second aspect, the third aspect, the fourth aspect, the fifth aspect, the sixth aspect, the seventh aspect, the eighth aspect, the ninth aspect, and the tenth aspect in this application, refer to beneficial effect analysis in the first aspect and the implementations of the first aspect. Details are not described herein again.

According to an eleventh aspect, an embodiment of this application provides a communications system. The system includes the first terminal in the third aspect and the possible implementations of the third aspect and the network device in the fourth aspect and the possible implementations of the fourth aspect.

BRIEF DESCRIPTION OF DRAWINGS

FIG. 4 is a schematic diagram in which different subcarrier spacings correspond to different symbol lengths:

FIG. 13 is a schematic structural diagram 2 of MAC CE signaling according to an embodiment of this application;

DESCRIPTION OF EMBODIMENTS

Figure 1:
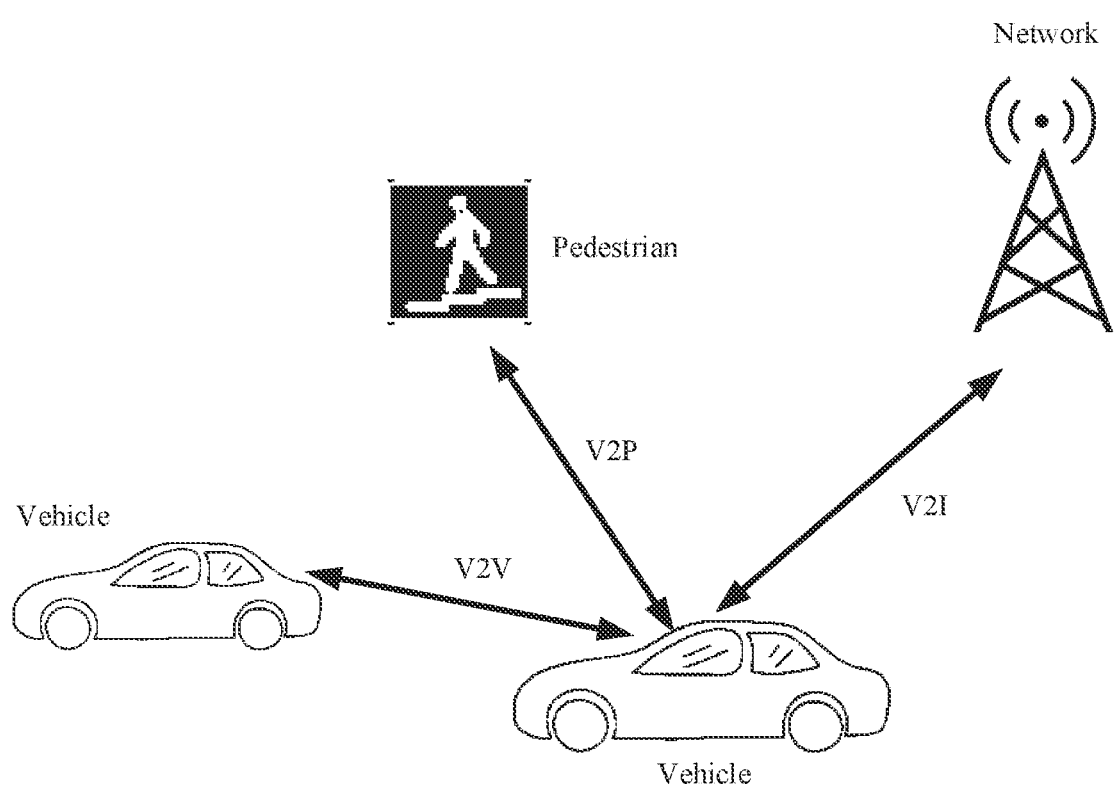
FIG. 1 is a schematic diagram of a V2X scenario according to an embodiment of this application.

It should be noted that, in embodiments of this application, the word "example" or "for example" is used to represent giving an example, an illustration, or a description. Any embodiment or design scheme described as an "example" or "for example" in the embodiments of this application should not be explained as being more preferred or having more advantages than another embodiment or design scheme. Exactly, use of the word "example" or "for example" or the like is intended to present a relative concept in a specific manner.

In this application, "at least one" means one or more, and "a plurality of" means two or more. The term "and/or" describes an association relationship between associated objects and represents that three relationships may exist. For example, A and/or B may represent the following cases: Only A exists, both A and B exist, and only B exists, where A and B may be singular or plural. The character "/" usually represents an "or" relationship between the associated objects. "At least one (piece) of the following" or a similar expression thereof means any combination of these items, including any combination of singular items (pieces) or plural items (pieces). For example, at least one (piece) of a, b, or c may represent: a, b, c; a and b; a and c; b and c; or a, b, and c: where a, b, and c may be singular or plural. In addition, for convenience of clear description of the technical solutions in the embodiments of this application, in the embodiments of this application, terms such as "first", "second", and the like are used to distinguish between same objects or similar objects whose functions and purposes are basically the same. A person skilled in the art may understand that the terms such as "first" and "second" do not limit a quantity or an execution sequence, and the terms such as "first" and "second" do not indicate a definite difference.

Before the embodiments of this application are described, terms in the embodiments of this application are first described.

(1) A sidelink (sidelink) is defined for direct communication between terminals, that is, a link for direct communication between the terminals without forwarding of a base station.

(2) Sidelink information is user data or control information transmitted between any two terminals on a sidelink.

(3) A sidelink resource is a resource used by a terminal 1 to transmit sidelink information with a terminal 2 on a sidelink.

(4) A power headroom report on a transmission link refers to a difference between a total maximum transmit power on the transmission link and a transmit power that has been used on the transmission link, that is, a transmit power that is not used on the transmission link; or when no information is sent on a transmission link, a power headroom report on the transmission link refers to a difference between a total maximum transmit power on the transmission link and a virtual transmit power on the transmission link.

(5) A Uu link is defined for direct communication between a terminal and a network device, that is, a link for direct communication between the terminal and the network device.

(6) Uu information is user data or control information transmitted by any terminal to a network device on a Uu link.

In the embodiments of this application, obtaining (reporting) at least one of A and B represents that three relationships may exist. For example, at least one of A and B may represent the following cases: Only A exists, both A and B exist, and only B exists, where A and B may be singular or plural.

A system architecture and a service scenario described in embodiments of this application are intended to describe the technical solutions in the embodiments of this application more clearly, and do not constitute a limitation on the technical solutions provided in the embodiments of this application. A person of ordinary skill in the art may know that with the evolution of the network architecture and the emergence of new service scenarios, the technical solutions provided in the embodiments of this application are also applicable to similar technical problems.

In 3GPP, a vehicle-to-everything technology based on a cellular network is proposed to interconnect vehicles through a V2X communications system. As shown in FIG. 1, the V2X communications system includes vehicle to vehicle (V2V), vehicle to pedestrian (V2P) (including a pedestrian, a cyclist, a driver, or a passenger), vehicle to infrastructure (V2I) (for example, vehicle to road side unit (RSU) communication) and vehicle to network (V2N) (for example, vehicle to base station/network communication) intelligent transportation services. Uplinks and downlinks are used for the V2N vehicle to network communication, but sidelinks are used for the V2V/V2I/V2P data communication.

The road side unit includes two types, an RSU of a terminal type, where because the RSU of the terminal type is deployed on a road side, the RSU of the terminal type is in a non-moving state, and mobility does not need to be considered; and an RSU of a base station type, which can provide timing synchronization and resource scheduling for a vehicle that communicates with the RSU of the base station type.

Figure 2:
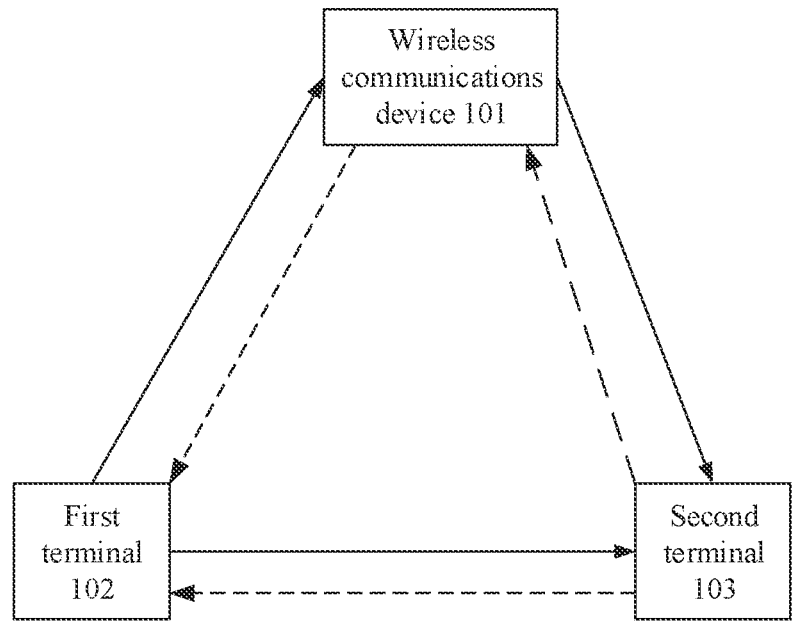
FIG. 2 is a schematic diagram of a communications system according to an embodiment of this application.

FIG. 2 is a schematic diagram of a communications system according to an embodiment of this application. The communications system includes a wireless communications device 101, one or more first terminals 102 that communicate with the wireless communications device 101, and at least one second terminal 103 that communicates with the first terminal 102.

There is a Uu link (where a second transmission link is used as an example below) between the wireless communications device 101 and the first terminal 102 or the second terminal 103. There is a sidelink (SL)(where a first transmission link is used as an example below) between the first terminal 102 and the second terminal 103.

The first terminal 102 and the second terminal 103 may transmit a V2X service to each other on the sidelink. The first terminal 102 or the second terminal 103 may transmit an uplink Uu service to the wireless communications device 101 on the Uu link, or may receive, on the Uu link, a downlink Uu service sent by the wireless communications device 101.

Usually, a V2X service is transmitted on a sidelink resource of the sidelink, and a Uu service is transmitted on a Uu resource of the Uu link.

Figure 3:
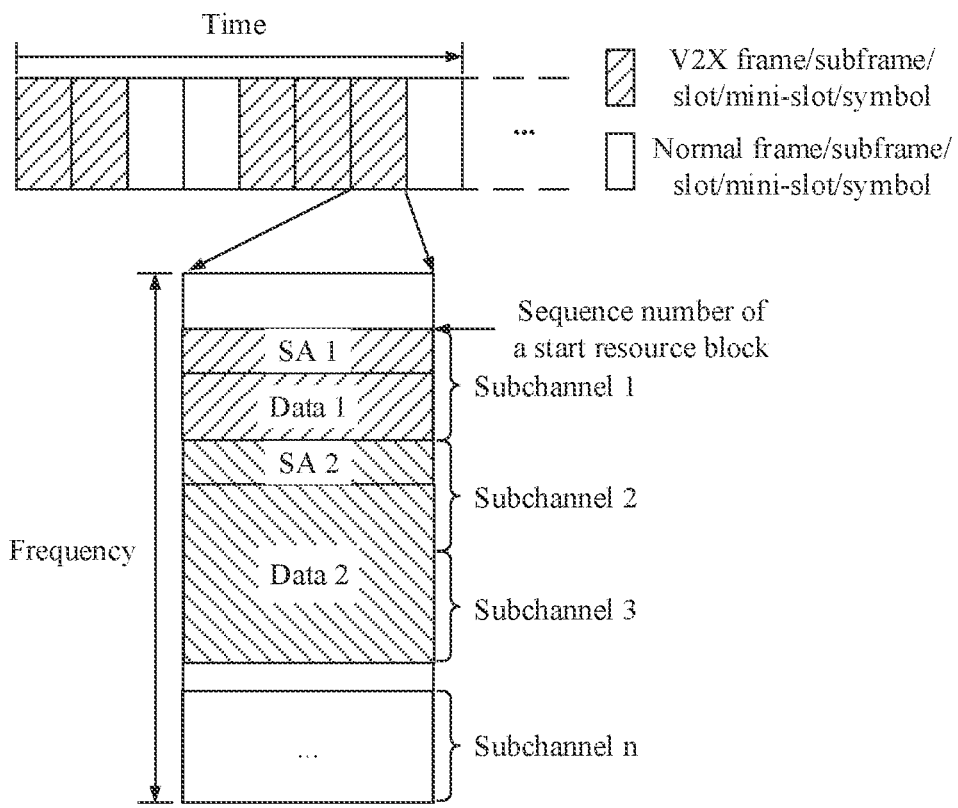
FIG. 3 is a schematic diagram of frequency division multiplexing of a sideline resource according to an embodiment of this application.

The sidelink resource includes a set of a time domain resource and a frequency domain resource. Specifically, for a time domain resource, different time granularities such as a frame, a subframe, a slot, a mini-slot, and a symbol may be used. For a frequency domain resource, a frequency band used for sidelink communication may be divided into several subchannels, and each subchannel includes a specific quantity of resource blocks (RB). One sidelink transmission may occupy one or more subchannels, to transmit a scheduling assignment (SA) SL control message (for example, sidelink control information, SCI) and user data. A frequency division multiplexing mode shown in FIG. 3 or a time division multiplexing mode may be used for the control message and the user data. FIG. 3 is a schematic diagram in which a frequency division multiplexing mode is used for SA and user data. The first terminal 102 occupies a subchannel 1 to perform sidelink transmission, and the second terminal 103 occupies a subchannel 2 and a subchannel 3 to perform sidelink transmission. The SA occupies a fixed physical resource block (PRB) size. For example, in LTE V2X, the SA occupies two PRBs.

A time domain resource may be a consecutive or inconsecutive time domain resource. The time domain resource may include one or more consecutive or inconsecutive symbols, and a part or all of the one or more symbols may belong to one or more slots.

A sidelink resource may be determined in the following two manners:

Manner 1: In LTE, a wireless communications device corresponding to a terminal allocates a time-frequency resource to the terminal within coverage of the wireless communications device. The terminal sends a control message and user data of sidelink communication on the scheduled time-frequency resource based on scheduling information of the wireless communications device, which is referred to as an LTE mode 3 transmission mode or a scheduling transmission mode. New radio (NR) includes an NR mode (mode)-1 and an NR mode-2. The NR mode-1 further includes transmission dynamically scheduled by a base station, semi-persistent transmission configured by the base station, and scheduling-free transmission configured by the base station.

Manner 2: In LTE, a terminal autonomously selects, from available time-frequency resources included in sidelink resources, a time-frequency resource used for communication, and sends a control message and data on the selected time-frequency resource, which is referred to as an LTE mode 4 transmission mode or an unscheduled transmission mode. In the sidelink unscheduled transmission mode, the terminal obtains an available time-frequency resource by using a sensing mechanism. An important step of the sensing includes: decoding all SA control messages on a frequency domain resource used for sidelink transmission within a historically previous period of time, to obtain information about time-frequency resources occupied and reserved by another terminal, so that these occupied and reserved time-frequency resources can be avoided when a time-frequency resource is autonomously selected to send data, thereby avoiding a data transmission failure caused by a resource conflict. In new radio (NR), an NR mode-2 includes: transmission of autonomously selecting a transmission resource based on sensing, auxiliary resource selection, pre-configured scheduling-free transmission, and transmission scheduled by another user.

The wireless communications device 101 may provide a basic device of a wireless network, for example, may be a cellular network base station, and provide support for communication between terminals, for example, provide support for communication between the wireless communications device 101 and the first terminal 102.

The wireless communications device 101 may be an evolved NodeB (eNB) in long time evolution (LTE). The eNB accesses a 4G core network (for example, an evolved packet core (EPC) network) through an S1 interface.

With continuous development of mobile communications technologies, a 4G network gradually evolves into a 5G network. In an evolution process, an LTE system may evolve into an eLTE system. An eNB in the eLTE system may access the EPC network, and may also access a next-generation core (NG-Core) network.

Alternatively, the wireless communications device 101 may be a next generation NodeB (gNB) in an NR system in NR. The gNB accesses the NG-Core network through an N2 interface.

An interface for direct communication between the first terminal 102 and the second terminal 103 may be an interface 1. For example, the interface 1 may be referred to as a PC5 interface for which a vehicle-to-even thing dedicated frequency band (for example, 5.9 GHz) is used. An interface between the first terminal 102 or the second terminal 103 and the wireless communications device 101 may be referred to as an interface 2 (for example, a Uu interface) for which a cellular network frequency band (for example, 1.8 GHz) is used.

Names of the interface 1 and the interface 2 are merely examples. The names of the interface 1 and the interface 2 are not limited in this embodiment of this application.

The terminal is a device having a wireless transceiver function, and may be deployed on the land, including an indoor or outdoor device, a hand-held device, a wearable device, or a vehicle-mounted device; may be deployed on the water surface (for example, in a steamship); or may be deployed in the air (for example, on an airplane, a balloon, or a satellite). The terminal is also referred to as user equipment (UE), a mobile station (MS), a mobile terminal (MT), a terminal device, and the like, and is a device that provides voice and/or data connectivity for a user. For example, the terminal includes a handheld device or a vehicle-mounted device having a wireless connection function. Currently, the terminal may be a mobile phone, a tablet computer, a notebook computer, a palmtop computer, a mobile internet device (MID), a wearable device (for example, a smartwatch, a smart band, or a pedometer), a vehicle-mounted device (for example, an automobile, a bicycle, an electric vehicle, an airplane, a ship, a train, or a high-speed train), a virtual reality (VR) device, an augmented reality (AR) device, a wireless terminal in industrial control, a smart home device (for example, a refrigerator, a television, an air conditioner, or an electricity meter), an intelligent robot, a workshop device, a wireless terminal in self driving, a wireless terminal in remote medical surgery, a wireless terminal in a smart grid, a wireless terminal in transportation safety, a wireless terminal in a smart city, a wireless terminal in a smart home, a flight device (for example, an intelligent robot, a hot balloon, an unmanned aerial vehicle, or an airplane), or the like. In a possible application scenario of this application, the terminal device is a terminal device that often operates on the land, for example, a vehicle-mounted device. In this application, for ease of description, a chip deployed in the foregoing device, or a chip may also be referred to as the terminal.

A method for reporting a power headroom report provided in this application is applicable to any terminal. The following mainly uses a land terminal as an example for description.

For example, the first terminal 102 and the second terminal 103 in this embodiment of this application may be a vehicle-mounted communications module or communications terminal, a handheld communications terminal, or a road side unit (RSU).

The wireless communications device 101 is a node in a radio access network, and may also be referred to as a base station, a radio access network (RAN) node (or device), or a network device. Currently, an example of the network device is a next generation NodeB (gNB) such as a new radio (NR) NodeB (NB) or a 5G base station, a transmission reception point (TRP), an evolved NodeB (eNB), a radio network controller (RNC), a NodeB (NB), a base station controller (BSC), a base transceiver station (BTS), a home base station (for example, a home evolved NodeB, or a home NodeB, HNB), a base band unit (BBU), a wireless fidelity (Wi-Fi) access point (AP), or the like.

A manner in which the first terminal 102 and the second terminal 103 communicate with the base station includes two types: frequency division duplex (FDD) and time division duplex (TDD). In this embodiment of this application, the TDD may mean that a same frequency band is used on an uplink and a downlink to perform transmission on different time domain resources. For example, a frequency band 1 is used on the uplink and the downlink, transmission of the uplink is performed on a time domain resource 1, and transmission of the downlink is performed on a time domain resource 2. The FDD may mean that different frequency bands are used on the uplink and the downlink to perform transmission on a same time domain resource. For example, a time domain resource 3 is used on the uplink and the downlink, a frequency band 2 is used on the uplink for transmission, and a frequency band 3 is used on the downlink for transmission.

In this embodiment of this application. TDD may be TDD in LTE, or may be TDD in NR. FDD may be FDD in LTE, or may be FDD in NR.

TDD used in NR may be referred to as dynamic TDD. In NR, a time domain resource is allocated in a unit of a slot or a symbol instead of a subframe. The network device may send time domain resource configuration information to the terminal. The time domain resource configuration information may indicate a downlink time domain resource, an uplink time domain resource, and a flexible time domain resource in time domain resources. For example, the time domain resource configuration information may be indicated in a form of the downlink time domain resource-the flexible time domain resource-the uplink time domain resource. In addition, NR is not limited to seven uplink-downlink subframe configurations of TDD, and locations and a quantity of downlink symbols, flexible symbols, or uplink symbols in an indicated time domain resource may be determined based on a scheduling status. ATDD spectrum in NR may be referred to as a paired spectrum.

FDD may be FDD in LTE. The network device may allocate an uplink frequency band and a downlink frequency band to the terminal. The uplink frequency band is used for uplink transmission, and the downlink frequency band is used for downlink transmission. The uplink and the downlink are distinguished by using different uplink and downlink frequency bands, and uplink transmission and downlink transmission may be simultaneously performed on a time domain resource. In other words, the time domain resource is both an uplink time domain resource and a downlink time domain resource. For a specific process, refer to descriptions in existing LTE. Details are not described herein again.

In this embodiment of this application, FDD may be FDD in NR. In NR, an uplink bandwidth part (BWP) and a downlink BWP may be allocated to the terminal. Time domain resources of the uplink BWP and the downlink BWP may be separately configured in an NR TDD mode. Time domain resources corresponding to the uplink BWP may be configured by using the time domain resource configuration information. For example, the time domain resources corresponding to the uplink BWP are configured as the flexible time domain resource-the uplink time domain resource by using the time domain resource configuration information, even the time domain resources corresponding to the uplink BWP may be configured as the downlink time domain resource-the flexible time domain resource-the uplink time domain resource by using the time domain resource configuration information. Time domain resources corresponding to the downlink BWP may be configured by using the time domain resource configuration information. For example, the time domain resources corresponding to the downlink BWP are configured as the downlink time domain resource-the flexible time domain resource by using the time domain resource configuration information, even the time domain resources corresponding to the downlink BWP may be configured as the downlink time domain resource-the flexible time domain resource-the uplink time domain resource by using the time domain resource configuration information. An FDD spectrum in NR may be referred to as an unpaired spectrum, and TDD and/or FDD in NR may be referred to as flexible duplex.

Bandwidth part: some frequency domain resources allocated by the base station to the terminal in a carrier, a carrier bandwidth, or a system bandwidth. A size of the BWP is less than or equal to a bandwidth capability of the terminal, that is, a maximum bandwidth supported by the terminal. In addition, the BWP is consecutive frequency domain resources. For example, the BWP may include a plurality of consecutive subcarriers. For another example, the BWP may include a plurality of consecutive physical resource blocks (PRB). The terminal may support a plurality of BWPs. In other words, the base station may configure a plurality of BWPs for the terminal. When a plurality of BWPs are configured, the BWPs may overlap or may not overlap. In addition, frequency domain resources included in different BWPs may have a same subcarrier spacing or may have different subcarrier spacings.

Carrier: carriers in the embodiments of this application include a carrier in a non-carrier aggregation (CA) scenario and a component carrier (CC) in a CA scenario. The CC in the CA scenario may be a primary CC or a secondary CC, and a serving cell in the CA scenario may be a primary serving cell (PCell) or a secondary serving cell (Scell). For ease of description, in some scenarios of the embodiments of this application, the carrier in the non-CA scenario and the CC in the CA scenario may be collectively referred to as carriers. This is not specifically limited in the embodiments of this application. In addition, a part, on a carrier or in a serving cell, used for uplink transmission may be understood as an uplink resource or an uplink carrier. For example, in a frequency division duplex (FDD) system, a frequency domain resource used for uplink transmission on a carrier may be understood as an uplink resource or an uplink carrier. Alternatively, for example, in a TDD system, a time domain resource used for uplink transmission on a carrier may be understood as an uplink resource or an uplink carrier.

A subcarrier spacing is a frequency domain length of a resource element (RE), and a value of the subcarrier spacing may include 15 kHz, 30 kHz, 60 kHz, or the like.

In 5G NR, a plurality of subcarrier spacings are introduced. A baseline is 15 kHz. The subcarrier spacing may be 15 kHz*2n, where n is an integer, and range from 3.75 kHz and 7.5 kHz to 480 kHz, and there are a maximum of eight subcarrier spacings. Correspondingly, there are a plurality of symbol lengths and subframe lengths, as shown in FIG. 4.

In 5G NR, one slot may include at least one of downlink transmission, a guard period (Guard Period, GP), uplink transmission, and the like. In this way, slots include at least the following types: a downlink slot (DL only slot), a downlink centric slot (DL centric slot), an uplink centric slot (UL centric slot), and an uplink slot (UL only slot), and the like.

Figure 5:
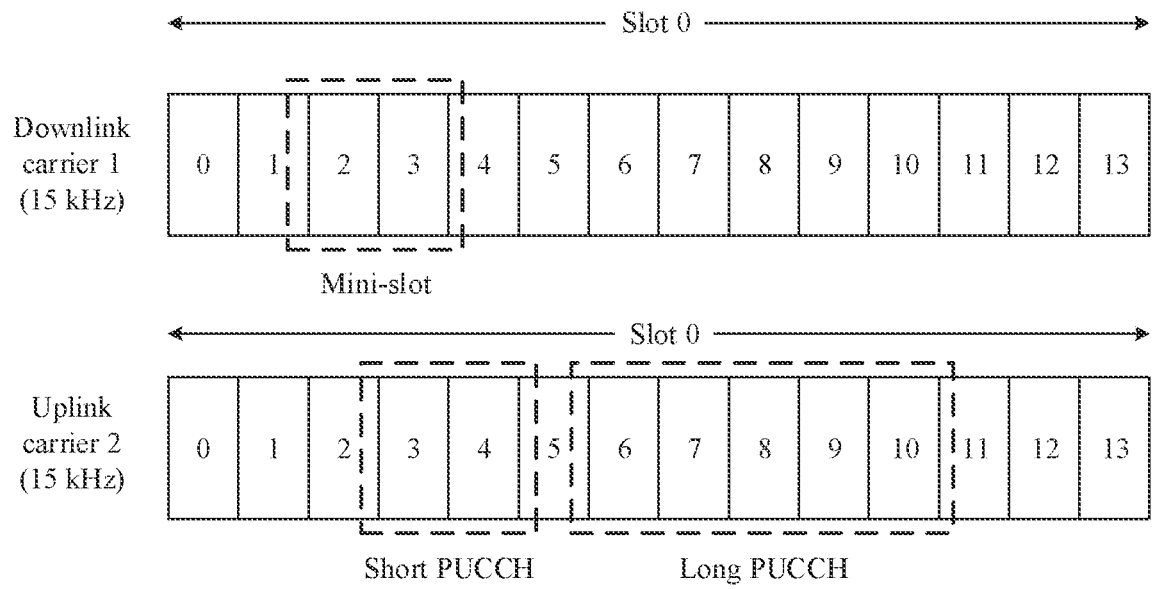
FIG. 5 is a schematic diagram of NR FDD.

Corresponding NR FDD system: downlink transmission (DL) operates on a downlink carrier 1, and uplink transmission (UL) operates on an uplink carrier 2. Different subcarrier spacings correspond to different lengths of subframes, slots, and mini-slots. Details are shown in FIG. 5. In FIG. 5, an example in which one slot includes 14 symbols is used, that is, symbols 0 to 13. For example, lengths of mini-slots of the downlink carrier 1 are the symbol 2 and the symbol 3.

Figure 6:
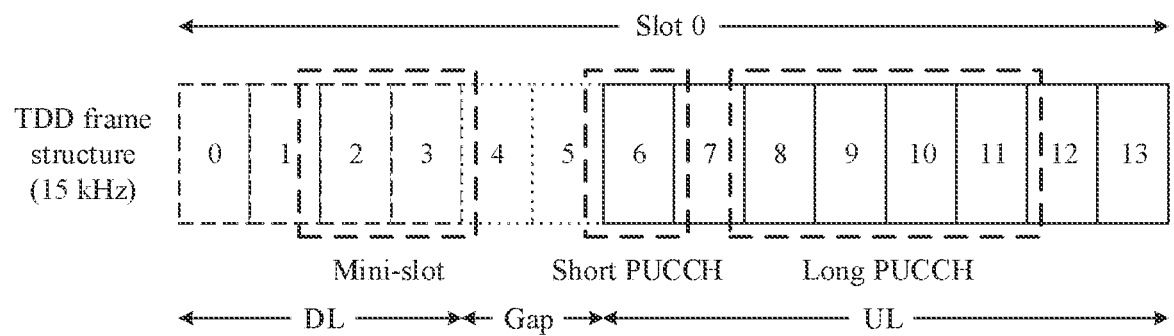
FIG. 6 is a schematic diagram of NR TDD.

Corresponding NR TDD system: the DL and the UL operate on a same carrier. Different subcarrier spacings correspond to different lengths of subframes, slots, and mini-slots. Details are shown in FIG. 6.

In NR, a slot or a mini-slot is currently used as a scheduling unit. The slot includes the 14 symbols, and the mini-slot may be two symbols, four symbols, or seven symbols.

Figure 7:
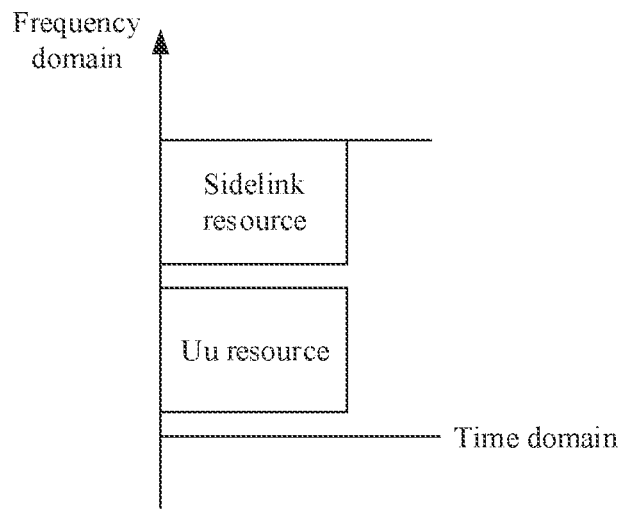
FIG. 7 is a schematic diagram of frequency division multiplexing of a sidelink resource and a Uu resource according to an embodiment of this application.

Currently, a sidelink resource and a Uu resource (which may be an uplink Uu resource, that is, a resource used by the terminal to send the Uu information to the network device in the embodiments of this application) may be resources on a shared carrier. Transmission may be performed on the sidelink resource and the Uu resource in a frequency division multiplexing manner. For example, as shown in FIG. 7, both the sidelink resource and the Uu resource are resources on a carrier 1. The sidelink resource and the Uu resource on the carrier 1 have a same time domain resource, but the sidelink resource and the Uu resource have different frequency domain resources. The sidelink resource and the Uu resource may be consecutive resources on a same carrier, or may be inconsecutive resources.

Alternatively, the sidelink resource is a resource on a dedicated NR sidelink carrier (for example, a carrier 2), the Uu resource is a resource on a carrier 3, and the sidelink resource on the carrier 2 and the Uu resource on the carrier 3 have a same time domain resource.

It should be understood that, in the embodiments of this application, resources obtained by performing frequency division multiplexing on the sidelink resource and the Uu resource may be resources occupied for channel transmission, or a resource occupied by the sidelink information and a resource occupied by the Uu information.

If transmission may be performed on the sidelink resource and the Uu resource in the frequency division multiplexing manner, how to more properly allocate a sidelink power and resource is an urgent problem to be resolved. In the embodiments of this application, a PHR of NR V2X is triggered and reported, and power and resource allocation are adjusted by using the PHR.

An embodiment of this application provides a method for reporting a PHR. A first terminal calculates a PHR on a first transmission link and a total PHR on the first transmission link and a second transmission link, and chooses to report at least one of the PHR on the first transmission link and the total PHR, so that a receiver can determine the power headroom report on the first transmission link based on the PHR on the first transmission link, and determine the total power headroom reports on the first transmission link and the second transmission link based on the total PHR. This facilitates subsequent power adjustment and resource allocation.

The method for reporting a power headroom report in this embodiment of this application may be performed by the first terminal, or may be performed by an apparatus used in the first terminal, for example, a chip used in the first terminal. A method for obtaining a power headroom report may be performed by a network device, or may be performed by an apparatus used in a network device, for example, a chip used in a network device. In the following embodiment, an example in which the method for obtaining a power headroom report is performed by the network device, and the method for reporting a power headroom report is performed by the first terminal is used.

Figure 8:
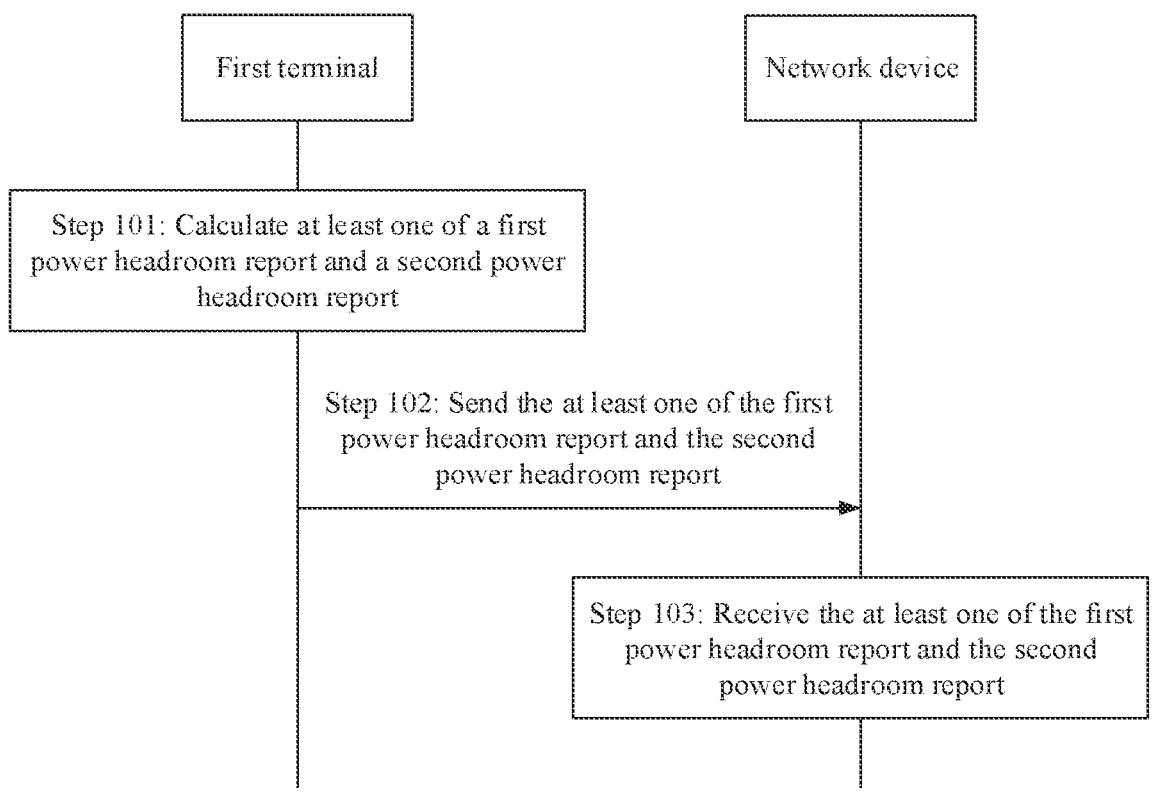
FIG. 8 is a schematic flowchart 1 of interaction in a method for reporting a PHR and a method for obtaining a PHR according to an embodiment of this application.

FIG. 8 is a flowchart of interaction in a method for reporting a power headroom report and a method for obtaining a power headroom report according to an embodiment of this application. The method includes the following steps.

Step 101. A first terminal calculates at least one of a first power headroom report (PHR) and a second power headroom report.

For example, the first terminal separately obtains the first power headroom report. The first terminal separately obtains the second power headroom report. The first terminal obtains the first power headroom report and the second power headroom report.

The first power headroom report is a power headroom report of a first transmission link, and the first transmission link is a wireless communication link between the first terminal and a second terminal. For example, the wireless communication link between the first terminal and the second terminal is a sidelink (SL), and the first power headroom report may be denoted as PHR_SL, indicating a PHR of the sidelink.

The second power headroom report is a total power headroom report of the first terminal on the first transmission link and a second transmission link, the second transmission link is a wireless communication link between the first terminal and a network device, and frequency division multiplexing FDM is performed on a part of transmission resources of the first transmission link and a part of transmission resources of the second transmission link. In other words, the second power headroom report is a total power headroom report on the first transmission link and the second transmission link when the first terminal communicates with the second terminal and the network device by using a frequency division multiplexing FDM technology.

For example, the wireless communication link between the first terminal and the network device is a Uu link, and the second power headroom report may be denoted as PHR_total, indicating a total PHR of the Uu link and the sidelink.

For example, that frequency division multiplexing FDM is performed on a part of transmission resources of the first transmission link and a part of transmission resources of the second transmission link may be explained as follows: Frequency division multiplexing is performed on a sidelink resource that is used to transmit a control message/user data and that is of the first transmission link and a Uu resource that is used to transmit a control message/user data and that is of the second transmission link. Alternatively, frequency division multiplexing is performed on a resource occupied by a Uu channel when the first terminal transmits Uu information to the network device through the Uu channel and a resource occupied by a sidelink channel when the first terminal sends sidelink information to the second terminal through the sidelink channel.

As described above, the sidelink resource and the Uu resource may be located on a same carrier, or may be located on different carriers.

A power headroom report is used to indicate power headroom.

It should be understood that, in this embodiment of this application, the first terminal may further obtain a third power headroom report, and the third power headroom report is a power headroom report on the second transmission link. For example, the second transmission link is a Uu link, and the third power headroom report may be denoted as PHR_Uu, indicating a PHR of the Uu link.

In this embodiment of this application, the part of transmission resources of the second transmission link are a Uu resource occupied to transmit Uu information when the first terminal performs uplink transmission with the network device. Alternatively, in this embodiment of this application, the part of transmission resources of the second transmission link are the resource occupied by the Uu channel when the first terminal transmits the Uu information to the network device through the Uu channel. The Uu channel includes a physical uplink shared channel (PUSCH), a physical uplink control channel (PUCCH), a physical broadcast channel (PBCH), a physical random access channel (PRACH), a reference signal (for example, a sounding reference signal (SRS), or a demodulation reference signal (DMRS)), another channel carrying the Uu information, or the like.

In this embodiment of this application, the part of transmission resources of the first transmission link may be a resource occupied by the first terminal to send the sidelink information to the second terminal. Alternatively, in this embodiment of this application, the part of transmission resources of the first transmission link may be the resource occupied by the sidelink channel when the first terminal sends the sidelink information to the second terminal through the sidelink channel. The sidelink channel includes a physical sidelink shared channel (PSSCH), a physical sidelink control channel (PSCCH), a physical sidelink format indicator channel (PSFCH), a reference signal, or another channel carrying the sidelink information.

A first maximum transmit power is jointly determined by using a power control parameter and a frequency division multiplexing working manner.

A second maximum transmit power is obtained through calculation by using a power control parameter of the second transmission link.

A second transmit power is jointly determined by using an open-loop power control parameter and closed-loop power adjustment.

For example, the third power headroom report in this embodiment of this application may be determined by using the second maximum transmit power on the second transmission link and the second transmit power on the second transmission link.

For example, PHR_Uu=Pcmax_Uu−Puu_t, where Pcmax_Uu represents the second maximum transmit power on the second transmission link, and Puu_t represents the second transmit power on the second transmission link. Pcmax_Uu may be a maximum transmit power of the first terminal on the second transmission link.

For example, the first power headroom report in this embodiment of this application may be determined by using a third maximum transmit power on the first transmission link and a first transmit power on the first transmission link. The third maximum transmit power on the first transmission link may be a maximum transmit power of the first terminal on the first transmission link.

For example, PHR_SL=Pcmax_SL−Psl_t, where Pcmax_SL represents the third maximum transmit power, and Psl_t represents the first transmit power on the first transmission link.

If a time division multiplexing manner is used for SA and the user data, the first transmit power may be a transmit power of the SA or a transmit power of the user data.

If a frequency division multiplexing manner is used for SA and the user data, and the SA and the user data are aligned in time domain, the first transmit power may be a sum of a transmit power of the SA and a transmit power of the user data.

If a frequency division multiplexing manner is used for SA and the user data, and the SA and the user data are not aligned in time domain and partially overlap, the first transmit power is a maximum value in a transmit power of an overlapping part and a transmit power of a non-overlapping part, that is, max (Poverlap, Pnon-overlap). Poverlap represents the power of the overlapping part. Pnon-overlap represents the transmit power of the non-overlapping part.

For example, the second PHR is determined based on the first maximum transmit power, the first transmit power, and the second transmit power. The first transmit power is a transmit power of the first terminal on the first transmission link, and the second transmit power is a transmit power of the first terminal on the second transmission link.

For example, the second PHR is obtained by subtracting the first transmit power and the second transmit power from the first maximum transmit power.

Frequency division multiplexing FDM is performed on the part of transmission resources of the first transmission link and the part of transmission resources of the second transmission link, and the part of transmission resources of the first transmission link and the part of transmission resources of the second transmission link may be located on a same carrier, or may be located on different carriers. Therefore, the first maximum transmit power may be determined in the following manner: Regardless of whether the part of transmission resources of the first transmission link and the part of transmission resources of the second transmission link are located on the same carrier, the first maximum transmit power is a maximum transmit power of the first terminal defined during FDM. Alternatively, the first maximum transmit power is determined based on a maximum transmit power of the first terminal on the first transmission link defined during FDM and a maximum transmit power of the first terminal on the second transmission link defined during FDM.

Example 1: PHR_total=Pcmax'−Puu_t−Psl_t. Pcmax' represents the maximum transmit power of the first terminal defined during FDM.

Example 2: PHR_total=Pcmax_Uu'−Puu_t)+(Pcmax_SL'−Psl_t). Pcmax_Uu' represents the maximum transmit power on the second transmission link during FDM sending, and Pcmax_SL' represents the maximum transmit power on the first transmission link during FDM sending. In the example 2, Pcmax'=Pcmax_Uu'+Pcmax_SL'.

If the first terminal is triggered to jointly report the first PHR, the second PHR, and the third PHR, in this case, no transmission may be actually sent for a type of PHR when joint triggering is performed. Therefore, the following separately describes a calculation manner of a PHR on each transmission link when no transmission is actually sent on a link.

Case 1: When the first terminal does not send the sidelink (sidelink) information on the first transmission link, the first PHR is a virtual PHR on the first transmission link. In this case, the first PHR is determined based on a maximum virtual transmit power on the first transmission link and the open-loop power control parameter.

For example, PHR_vSL=Pcmax_vSL−{p0+alpha*PL}, where PHR_vSL represents the virtual PHR on the first transmission link. Pcmax_vSL represents the maximum virtual transmit power on the first transmission link. p0 and alpha are open-loop power control parameters. PL represents a path loss between a sending terminal (for example, the first terminal) and a receiving terminal (for example, the second terminal), a path loss between a sending terminal and the network device, or a larger value or a smaller value in a path loss between a sending terminal and a receiving terminal and a path loss between a sending terminal and the network device.

The maximum virtual transmit power on the first transmission link is obtained by using a default or pre-configured power control parameter of the first transmission link.

Case 2: When the first terminal does not send the sidelink information on the first transmission link and the first terminal does not send the Uu information on the second transmission link, the second PHR may be a virtual total PHR on the first transmission link and the second transmission link. In this case, the second PHR is determined based on a first maximum virtual transmit power, a virtual transmit power on the first transmission link, and a virtual transmit power on the second transmission link. The first maximum virtual transmit power is a maximum virtual transmit power of the first terminal, or the first maximum virtual transmit power is determined based on a maximum virtual transmit power of the first terminal on the first transmission link and a maximum virtual transmit power of the first terminal on the second transmission link.

Example 3—PHR_total=Pcmax'_v−P_v_u−P_v_s. Pcmax'_v represents the first maximum virtual transmit power, P_v_u represents the virtual transmit power on the second transmission link, and P_v_s represents the virtual transmit power on the first transmission link.

Example 4: PHR_total=(Pcmax_Uu'−P_v_u)+(Pcmax_SL'−P_v_s). Pcmax_Uu' represents the maximum virtual transmit power of the first terminal on the second transmission link, P_v_u represents the virtual transmit power on the second transmission link, and P_v_s represents the virtual transmit power on the first transmission link. Alternatively, Pcmax_SL' and Pcmax_Uu' may be added to obtain the first maximum virtual transmit power.

The first maximum virtual transmit power is jointly determined by using a default or pre-configured power control parameter and a frequency division multiplexing working manner.

The maximum virtual transmit power on the second transmission link is obtained by using a default or pre-configured power control parameter of the second transmission link.

Case 3: When the first terminal does not send the Uu information on the second transmission link, the third PHR may be a virtual PHR. In this case, the third PHR is determined based on the maximum virtual transmit power on the second transmission link and the open-loop power control parameter.

For example, the third PHR may be calculated according to the following formula:

$$PH_{type1,b,f,c}(i,j,q_d,l) = \tilde{P}_{CMAX,f,c}(i) - \{P_{O\_PUSCH,b,f,c}(j) + \alpha_{b,f,c}(j) \cdot PL_{b,f,c}(q_d) + f_{b,f,c}(i,l)\}.$$

$P_{O\_PUSCH,b,f,c}(j)$ and $\alpha_{b,f,c}(j)$ represent power control parameters configured by using a higher layer. $PL_{b,f,c}(q_d)$ represents a downlink path loss calculated by the first terminal by using a reference signal (reference signal, RS) index $q_d$. $f_{b,f,c}(i,l)$ represents closed-loop power control adjustment. $\tilde{P}_{CMAX,f,c}(i)$ represents a maximum allowed transmit power of a terminal. $PH_{type1,b,f,c}(i,j,q_d,l)$ represents the third PHR.

Case 4: When the first terminal does not send the sidelink information on the first transmission link and the first terminal sends the Uu information on the second transmission link, the second PHR may be a virtual total PHR on the first transmission link and the second transmission link. In this case, the second PHR is determined based on the first maximum virtual transmit power, a virtual transmit power on the first transmission link, and the second transmit power on the second transmission link. The first maximum virtual transmit power is a maximum virtual transmit power of the first terminal, or the first maximum virtual transmit power is determined based on a maximum virtual transmit power of the first terminal on the first transmission link and a maximum virtual transmit power of the first terminal on the second transmission link.

Case 5: When the first terminal sends the sidelink information on the first transmission link and the first terminal does not send the Uu information on the second transmission link, the second PHR may be a virtual total PHR on the first transmission link and the second transmission link. In this case, the second PHR is determined based on a first maximum virtual transmit power, the first transmit power on the first transmission link, and a virtual transmit power on the second transmission link. The first maximum virtual transmit power is a maximum virtual transmit power of the first terminal, or the first maximum virtual transmit power is determined based on a maximum virtual transmit power of the first terminal on the first transmission link and a maximum virtual transmit power of the first terminal on the second transmission link.

It should be noted that, if the first PHR, the second PHR, and the third PHR are triggered for the first terminal, real transmission (for example, sending control information or data) exists on one transmission link, and no information is sent on the other transmission link, for a manner of calculating a PHR on the transmission link on which no information is sent, reference may be made to the foregoing descriptions, and a PHR may be determined based on a maximum transmit power on the transmission link and a transmit power on the transmission link if real transmission exists on the transmission link. In this case, the second PHR may be obtained by adding the PHR on the transmission link on which actual transmission is performed and the PHR on the transmission link on which no information is sent.

Step 102: The first terminal sends the at least one of the first power headroom report and the second power headroom report.

For example, the first terminal separately sends the first PHR, and the first terminal separately sends the second PHR. The first terminal sends the first PHR and the second PHR.

For example, the first terminal may send the at least one of the first PHR and the second PHR to the network device.

It should be understood that the first terminal may send the at least one of the first PHR and the second PHR to the network device on a Uu resource of the second transmission link. The Uu resource may be allocated by the network device to the first terminal, or may be pre-configured for the first terminal.

Step 103: The network device receives the at least one of the first PHR and the second PHR.

For example, the network device may receive the at least one of the first PHR and the second PHR on the Uu resource of the second transmission link.

It should be understood that a PHR that may be received by the network device is a PHR sent by the first terminal.

It should be understood that if the first terminal sends the third PHR to the network device, the network device receives the third PHR.

This embodiment of this application provides the method for reporting a power headroom report. The first terminal calculates the at least one of the first PHR and the second PHR, so that when the first terminal reports the at least one of the first PHR and the second PHR, a receiver can determine the power headroom report on the first transmission link based on the first PHR, and determine the total power headroom report on the first transmission link and the second transmission link based on the second PHR. In this way, when frequency division multiplexing is performed on the part of transmission resources of the first transmission link and the part of transmission resources of the second transmission link, subsequent power adjustment and resource allocation can be facilitated.

The foregoing mainly describes a manner of calculating the at least one of the first PHR and the second PHR by the first terminal. The following describes a PHR triggering manner.

(1) Determining of the First Terminal

In this embodiment of this application, the first terminal may autonomously determine whether to report at least one of the first PHR the third PHR, and the second PHR.

For example, when the first terminal obtains the first power headroom report through calculation, and the first terminal determines that power headroom, of the first transmission link, indicated by using the first PHR is less than or equal to a second threshold, the first terminal reports the first PHR. For example, when the first terminal obtains the second PHR through calculation, and the first terminal determines that total power headroom indicated by using the second PHR is less than or equal to the third threshold, the first terminal reports the second PHR. When the first terminal determines that power headroom indicated by using the third PHR is less than or equal to a fourth threshold, the first terminal reports the third PHR.

Certainly, when determining that the total power headroom indicated by using the second PHR is less than or equal to the third threshold, and determining that the power headroom indicated by using the first PHR is less than or equal to the second threshold, the first terminal reports the first PHR and the second PHR.

Values of the second threshold, the third threshold, and the fourth threshold are not limited in this embodiment of this application. The second threshold, the third threshold, and the fourth threshold may be configured by the network for the first terminal, or may be determined by the first terminal.

In this case, in step 102, the first terminal reports a PHR that meets a reporting condition (2) Periodic Reporting In this embodiment of this application, when obtaining at least one of the first PHR, the third PHR, and the second PHR through calculation, the first terminal may periodically report a calculated PHR based on a pre-configured periodicity.

(3) Signaling-Based Triggering

To be specific, the first terminal determines, based on received signaling, to report a PHR.

Figure 9:
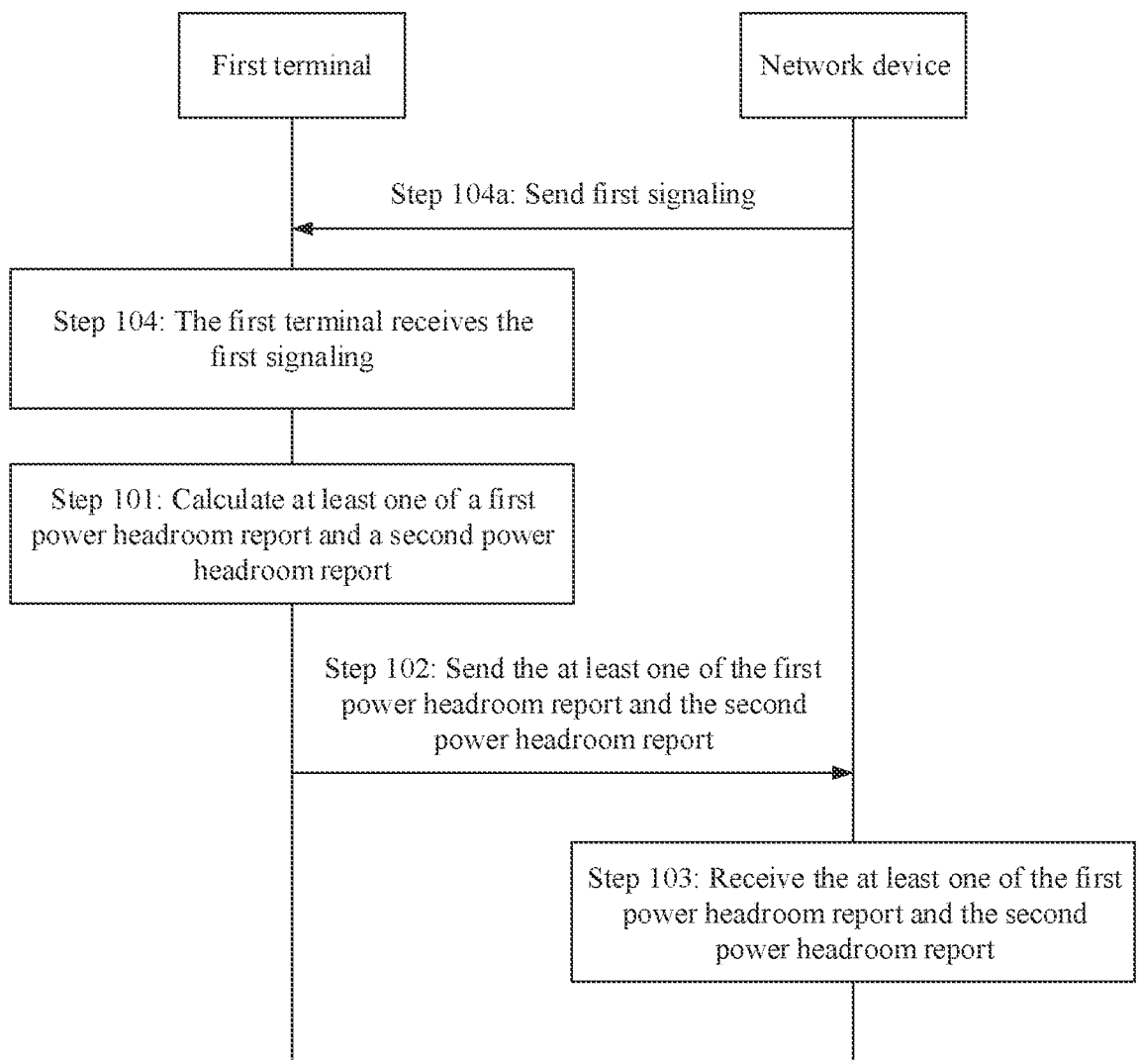
FIG. 9 is a schematic flowchart 2 of interaction in a method for reporting a PHR and a method for obtaining a PHR according to an embodiment of this application.

In some embodiments, as shown in FIG. 9, the method provided in this application further includes the following steps.

Step 104: The first terminal receives first signaling. The first signaling is used to trigger reporting of the at least one of the first PHR and the second PHR. Alternatively, the first signaling is used to trigger reporting of the third PHR and at least one of the following PHRs: the first PHR and the second PHR and the third PHR is a PHR of the first terminal on the second transmission link. Certainly, it may be understood that the first signaling may be further used to trigger reporting of any one of the first PHR, the second PHR, and the third PHR For example, the first signaling may be sent by the network device to the first terminal. Therefore, before step 104, the method provided in this embodiment of this application further includes step 104*a*: The network device sends the first signaling to the first terminal.

It should be understood that, that the first signaling is used to trigger reporting of the third PHR and at least one of the following PHRs: the first PHR and the second PHR may be that the first signaling is used to trigger reporting of the third PHR and the first PHR. Alternatively, the first signaling is used to trigger reporting of the third PHR and the second PHR. Alternatively, the first signaling is used to trigger reporting of the third PHR, the second PHR, and the first PHR.

The first signaling is media access control (Media Access Control, MAC) signaling or higher layer signaling.

Triggering Manner 1: Separate Triggering

When the first signaling is used to separately trigger any one of the first PHR, the second PHR, and the third PHR, the first signaling may be Uu MAC signaling or Uu higher layer signaling.

When the first signaling is used to separately trigger the third PHR, the first signaling is Uu MAC signaling. When the first signaling is used to separately trigger either of the second PHR and the first PHR, the first signaling may be sidelink MAC signaling.

Triggering Manner 2: Joint Triggering (A) The first PHR, the second PHR, and the third PHR are jointly triggered. In this case, the first signaling may be Uu MAC signaling or Uu higher layer signaling.

(B) The third PHR is separately triggered, and the first PHR and the second PHR are jointly triggered. The first PHR and the second PHR are jointly triggered. The third PHR and the second PHR are jointly triggered. The first PHR and the third PHR are jointly triggered.

During joint triggering, if the first PHR and the second PHR are jointly triggered, the first signaling may be Uu MAC signaling or Uu higher layer signaling. Alternatively, both the first PHR and the second PHR are triggered by using sidelink MAC signaling or sidelink higher layer signaling.

It should be noted that when the first terminal reports at least one of the first PHR, the second PHR, and the third PHR based on triggering of the first signaling, the first terminal may calculate, based on an indication of the first signaling, a PHR requested by the first signaling when receiving the first signaling, and then report the calculated PHR. For example, if the first signaling requests the second PHR, the first terminal calculates the second PHR, and then reports the second PHR. For example, if the first signaling requests the first PHR and the second PHR, the first terminal calculates the first PHR and the second PHR, and then reports the first PHR and the second PHR. If the first terminal already has at least one of the first PHR, the second PHR, and the third PHR, when receiving the first signaling, the first terminal may report, from the existing first PHR the existing second PHR or the existing third PHR based on a request of the first signaling, a PHR requested by the first signaling.

It should be understood that, during triggered reporting that is based on the first signaling, in step 102, the first terminal reports, based on triggering of the first signaling, the PHR triggered by the first signaling.

(4) Triggered Reporting that is Based on a Preset Condition.

In some embodiments, the method provided in this embodiment of this application further includes:

When the preset condition is met, the first terminal determines to report the at least one of the first PHR and the second PHR, or the first terminal reports the third PHR and at least one of the following PHRs: the first PHR and the second PHR The preset condition includes that a prohibit timer (phr-ProhibitTimer) expires and any one of the following: a sidelink resource set is switched, a sidelink resource set is reconfigured, and the first terminal does not use a sidelink maximum transmit power to send information on the first transmission link, where the sidelink resource set is used to transmit information sent on the first transmission link.

Prohibit timer: A PHR value is not allowed to be changed within a period of time specified by the timer. After the prohibit timer expires, the PHR value may be changed.

Sidelink resource set: which is a set of resources that may be used to transmit the sidelink information. The sidelink resource set may be configured by the network device, or may be selected by the first terminal.

Reconfiguring a sidelink resource set: The network device reconfigures a sidelink resource pool by using higher layer signaling, for example, RRC signaling, including: A size of the resource pool or an association relationship of the resource pool is reconfigured. For example, a resource pool 1 is initially configured as unicast, and then is updated to broadcast.

For example, the sidelink resource set may be a resource pool, and the resource pool may be associated with a plurality of factors. For example, the resource pool is associated with unicast, group cast, and broadcast.

For example, the resource pool 1 is used to broadcast the information sent on the first transmission link, and a resource pool 2 is used to unicast the information sent on the first transmission link. Due to coverage, when the prohibit timer expires, if the first terminal is switched from the resource pool 1 to the resource pool 2, the first terminal determines to report the at least one of the first PHR and the second PHR, or the first terminal reports the third PHR and the at least one of the following PHRs: the first PHR and the second PHR.

Figures 10, 11:
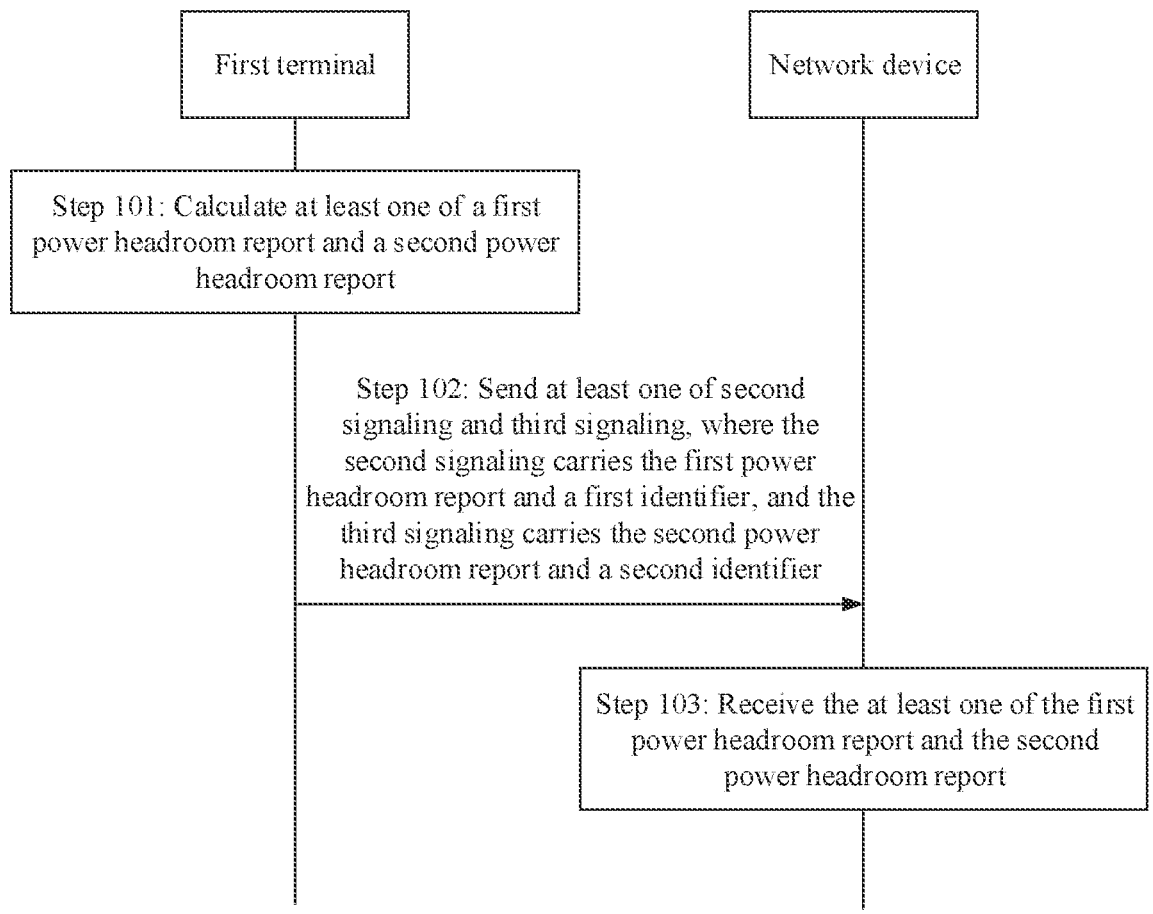
FIG. 10 is a schematic flowchart 3 of interaction in a method for reporting a PHR and a method for obtaining a PHR according to an embodiment of this application.
FIG. 11 is a schematic structural diagram 1 of MAC CE signaling according to an embodiment of this application.

In some embodiments, as shown in FIG. 10, in a possible implementation, step 102 may be implemented in the following manner.

Step 102: The first terminal sends at least one of second signaling and third signaling, where the second signaling carries the first PHR and a first identifier, the third signaling carries the second PHR and a second identifier, the first identifier is used to identify the first PHR, and the second identifier is used to identify the second PHR.

Optionally, the first signaling and the second signaling are not the same signaling.

For example, the second signaling and the third signaling may be MAC control elements (CE). The first identifier or the second identifier may be at least one bit in a MAC CE. That is, at least one reserved bit in a MAC CE is used to identify a PHR carried in the MAC CE.

For example, at least one reserved bit in a MAC CE carrying the first PHR is used to indicate that the first PHR is a PHR on the first transmission link. At least one reserved bit in a MAC CE carrying the second PHR is used to indicate that the second PHR is a total PHR on the first transmission link and the second transmission link.

It should be understood that one MAC CE is usually further used to carry a value of the PHR. It should be understood that the third PHR may also be carried in fifth signaling. In this case, the fifth signaling carries the third PHR, and is used to identify information about the third PHR. Specifically, for a structure of the fifth signaling, refer to FIG. 11.

It should be understood that in this case, the network device may obtain the first PHR from the second signaling, and obtain the second PHR from the third signaling.

As shown in FIG. 11, an example in which a MAC CE carries PHR_total is used. In this case, the MAC CE may usually include a value of PHR_total, a second identifier, and a value of a maximum transmit power used to calculate PHR_total. In FIG. 11, R represents a reserved bit. It should be understood that, if the MAC CE carries PHR_SL, the MAC CE includes a value of PHR_SL, a first identifier, and a value of a maximum transmit power used to calculate PHR_SL.

It should be understood that, in FIG. 10, an example in which the first terminal sends the second signaling and the third signaling to the network device is used.

Figure 12:
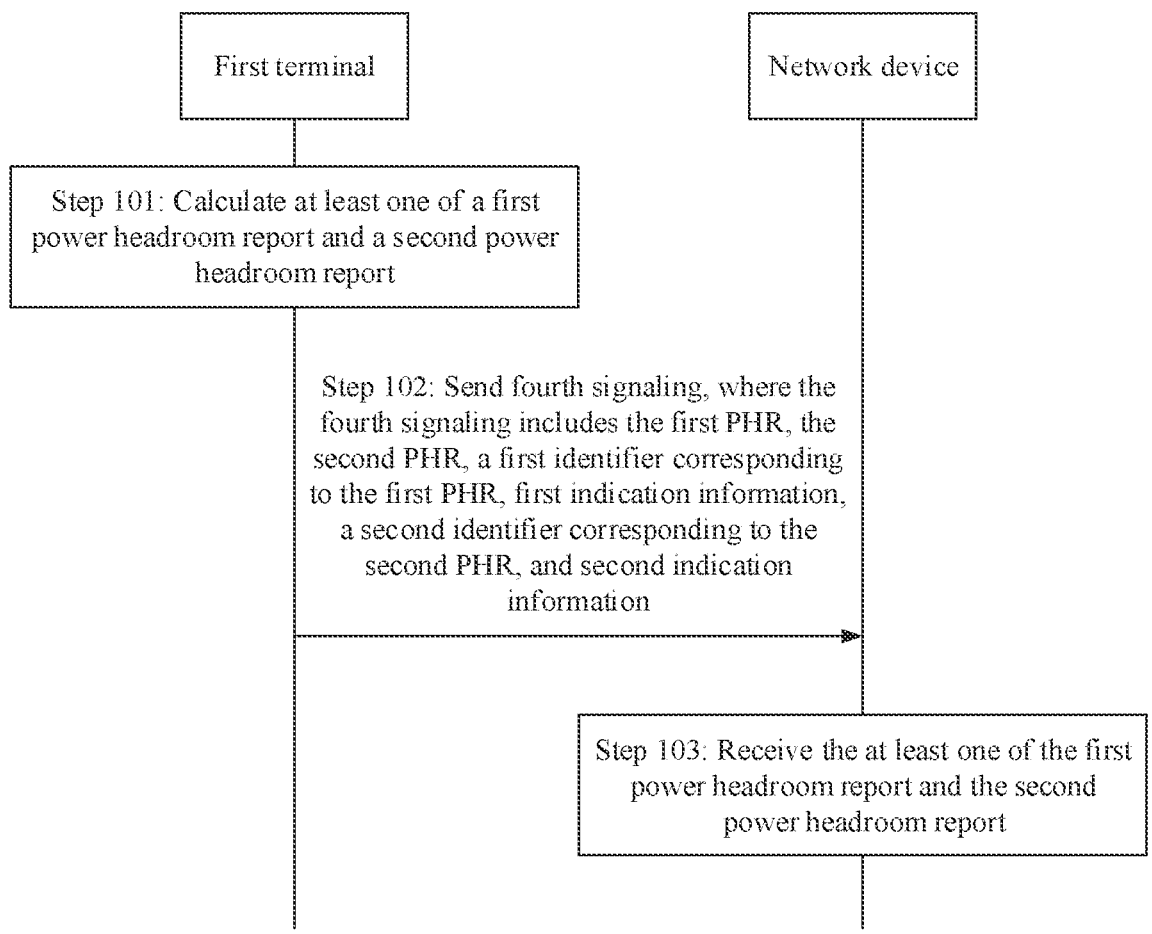
FIG. 12 is a schematic flowchart 4 of interaction in a method for reporting a PHR and a method for obtaining a PHR according to an embodiment of this application.

FIG. 10 mainly describes that different PHRs are carried in different MAC CEs. Certainly, different PHRs may alternatively be carried in a same MAC CE. In another embodiment of this application, as shown in FIG. 12, in a possible implementation, step 102 may be implemented in the following manner.

Step 102. The first terminal sends fourth signaling, where the fourth signaling includes the first PHR, the second PHR, a first identifier corresponding to the first PHR, first indication information, a second identifier corresponding to the second PHR, and second indication information.

If one PHR corresponds to one carrier, the fourth signaling may not carry information about a time-frequency resource corresponding to each PHR.

As a possibility, the carrier may be a type of time-frequency resource.

In some embodiments, for example, in a case of carrier aggregation, one PHR may be a PHR on a plurality of time-frequency resources. Therefore, the first indication information is used to indicate information about a plurality of time-frequency resources corresponding to the first PHR. The second indication information is used to indicate information about a plurality of time-frequency resources corresponding to the second PHR.

Certainly, if the third PHR is triggered, the fourth signaling further needs to carry the third PHR, a third identifier corresponding to the third PHR, and third indication information. The third indication information is used to indicate information about a plurality of time-frequency resources corresponding to the third PHR.

It should be understood that, in this case, the network device may determine at least one of the first PHR, the second PHR, and the third PHR by using the fourth signaling.

For example, as shown in FIG. 13, an example in which a time-frequency resource is a carrier is used in FIG. 13. C 1 to C 7 and C 23 to C 31 are carriers corresponding to the third PHR. C 8 to C 15 are carriers corresponding to the first PHR C 16 to C 23 are carriers corresponding to the second PHR.

When a plurality of PHRs in the first PHR, the second PHR, and the third PHR are triggered, the first terminal reports a PHR with a high priority in the triggered PHRs based on a priority of the first PHR, a priority of the second PHR, and a priority of the third PHR.

It should be understood that the first terminal has a priority of each of the first PHR, the second PHR, and the third PHR. The priority of each PHR may be determined by the first terminal, or may be configured by the network device for the first terminal, or may be pre-configured for the first terminal. This is not limited in this embodiment of this application.

For example, in this embodiment of this application, the priority of the second PHR is higher than the priority of the first PHR and the priority of the third PHR. Further, the priority of the first PHR is higher than the priority of the third PHR.

For example, if the first PHR and the second PHR are jointly triggered, the first terminal preferentially reports the second PHR.

Figure 14:
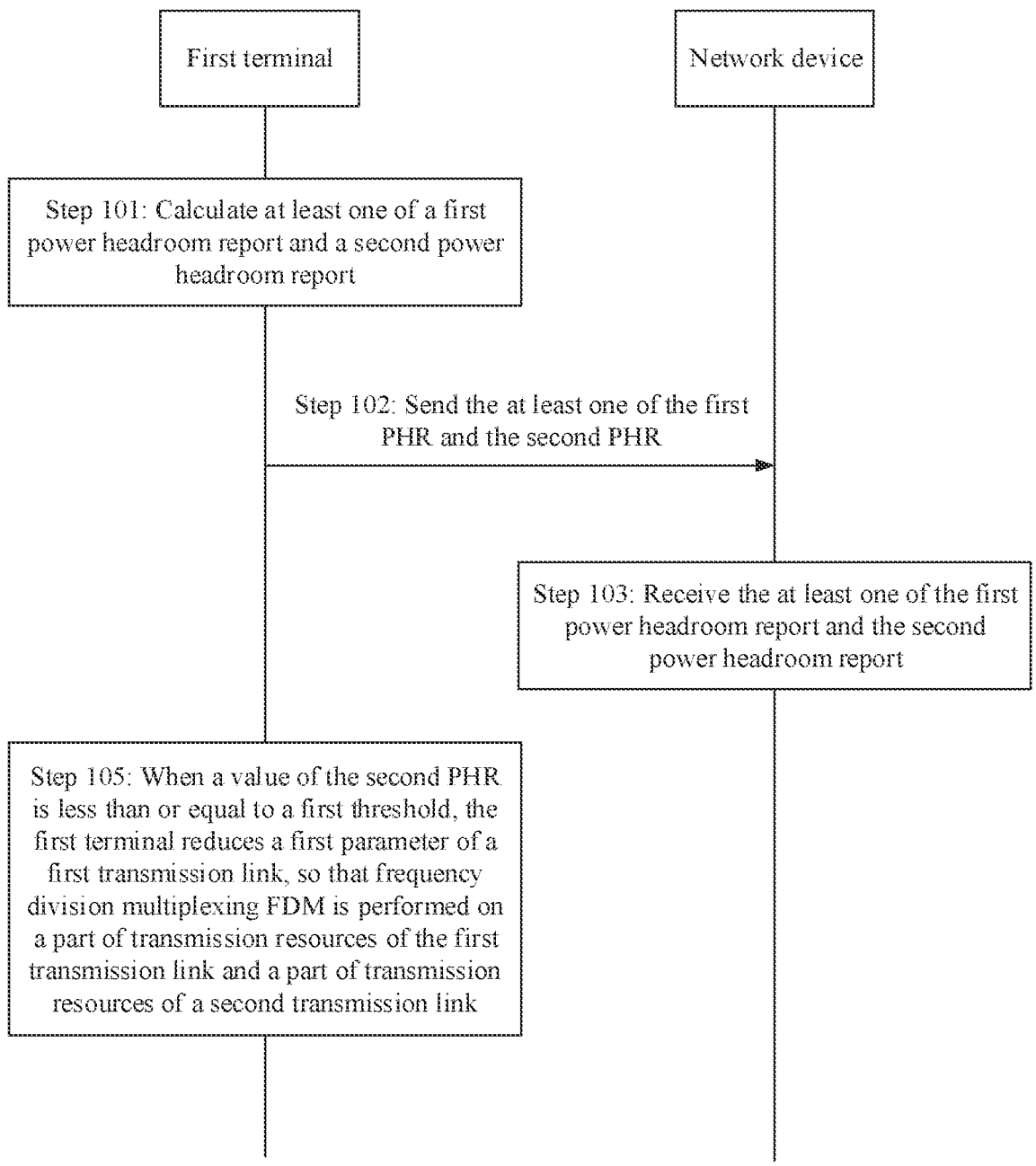
FIG. 14 is a schematic flowchart 5 of interaction in a method for reporting a PHR and a method for obtaining a PHR according to an embodiment of this application.

After the first terminal obtains the second PHR, the first terminal may adjust a first parameter of the first terminal based on the second PHR. Therefore, as shown in FIG. 14, in some embodiments, in a possible implementation, the method provided in this embodiment of this application further includes the following step.

Step 105: When a value of the second PHR is less than or equal to a first threshold, the first terminal reduces a first parameter of the first transmission link, so that frequency division multiplexing FDM is performed on the part of transmission resources of the first transmission link and the part of transmission resources of the second transmission link, where the first parameter is a transmit power or a bandwidth.

For example, when the value of the second PHR is less than or equal to the first threshold, the first terminal may reduce the bandwidth of the first transmission link. Specifically, the first terminal reduces a quantity of RBs allocated to the first transmission link. This is because the information transmitted on the first transmission link is periodically transmitted, sidelink control information SCI is sent before each time of periodic information is sent, and one bit is used in the SCI to indicate to use an original quantity of RBs to send next time of periodic information when next sidelink periodic transmission is sent. SL transmission is periodic, and Uu transmission is triggered once. There may be no Uu transmission, in next transmission, on which FDM needs to be performed. The transmission bandwidth should be restored to the quantity of RBs before the reduction.

Figure 15:
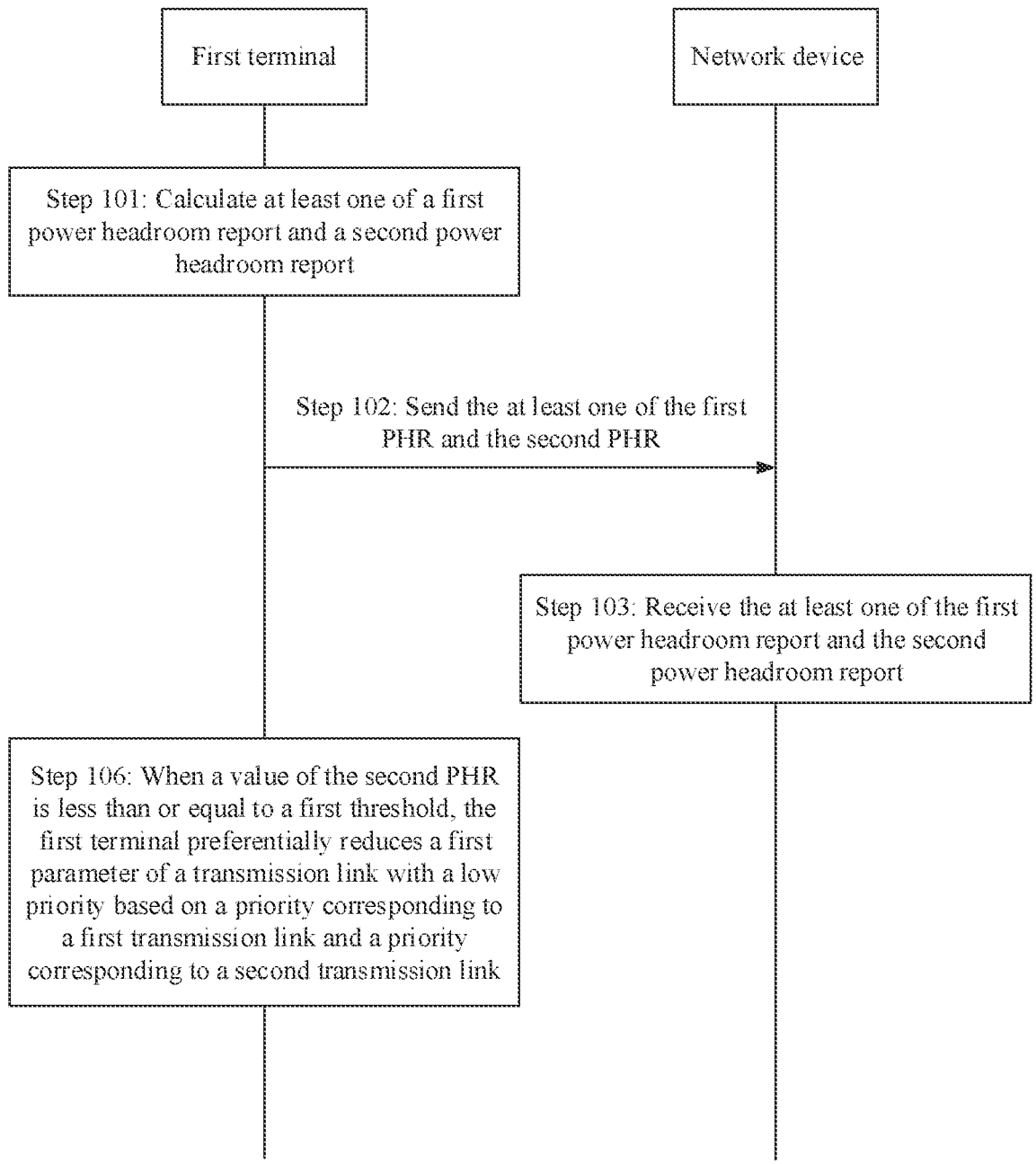
FIG. 15 is a schematic flowchart 6 of interaction in a method for reporting a PHR and a method for obtaining a PHR according to an embodiment of this application.

Therefore, in some embodiments, as shown in FIG. 15, in another possible implementation, the method provided in this embodiment of this application further includes the following step.

Step 106: When a value of the second PHR is less than or equal to a first threshold, the first terminal preferentially reduces a first parameter of a transmission link with a low priority based on a priority corresponding to the first transmission link and a priority corresponding to the second transmission link, where the first parameter is a transmit power or a bandwidth.

A bandwidth of a transmission link represents a bandwidth or a quantity of resource blocks (RB) used to transmit information on the transmission link.

The first threshold in this embodiment of this application may be set based on a requirement. For example, the first threshold may be 0.

It should be understood that, in step 106, after the first parameter is reduced, FDM can be performed on the part of transmission resources of the first transmission link and the part of transmission resources of the second transmission link.

For example, a priority corresponding to the transmission link includes a priority of the transmission link or a priority corresponding to information transmitted on the transmission link. For example, the sidelink information is transmitted on the first transmission link, and the Uu information is transmitted on the second transmission link. If a priority of the sidelink information is higher than a priority of the Uu information, the first terminal preferentially reduces a first parameter of the second transmission link when the value of the second PHR is less than or equal to the first threshold.

The priority corresponding to the transmission link may be pre-configured for the first terminal, or may be determined by the first terminal based on a priority of a corresponding service on the transmission link. This is not limited in this embodiment of this application.

Figure 16:
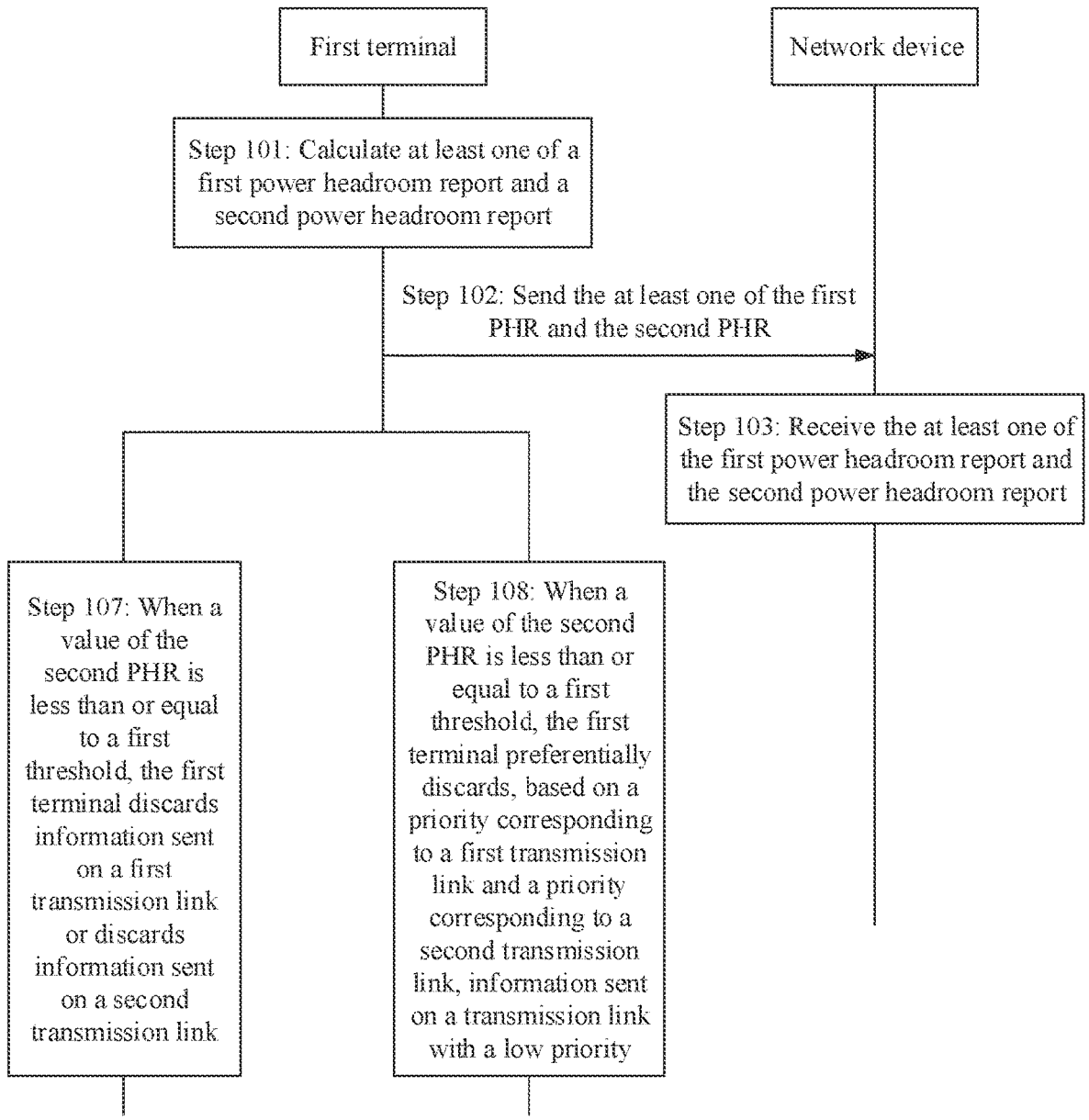
FIG. 16 is a schematic flowchart 7 of interaction in a method for reporting a PHR and a method for obtaining a PHR according to an embodiment of this application.

Therefore, as shown in FIG. 16, in still another possible implementation, the method provided in this embodiment of this application further includes step 107 or step 108.

Step 107: When a value of the second PHR is less than or equal to a first threshold, the first terminal discards information sent on the first transmission link or discards information sent on the second transmission link.

Step 108: When a value of the second PHR is less than or equal to a first threshold, the first terminal preferentially discards, based on a priority corresponding to the first transmission link and a priority corresponding to the second transmission link, information sent on a transmission link with a low priority.

In step 107, the first terminal may choose to discard the information sent on the first transmission link or the information sent on the second transmission link. In step 108, the first terminal needs to choose, based on the priority corresponding to the first transmission link and the priority corresponding to the second transmission link, to discard the information sent on the transmission link with the low priority.

For example, the priority of the first transmission link is low. In this case, when the second PHR is 0, the first terminal chooses to discard the information sent on the first transmission link.

In this embodiment of this application, the information sent on the transmission link includes control information or data sent on the transmission link.

For example, the priority of the first transmission link in this embodiment of this application is determined based on a priority parameter defined in quality of service QoS. The priority of the second transmission link is determined based on a priority parameter defined in quality of service QoS.

For example, the priority parameter may be a service priority, coverage, a modulation and coding scheme, a throughput, a transmission latency, transmission reliability, and the like. One or more factors of the service priority, the coverage, the modulation and coding scheme, the throughput, the transmission latency, the transmission reliability, and the like are used to determine a transmission priority level. A higher level indicates a higher transmission priority.

The foregoing mainly describes the solutions in the embodiments of this application from a perspective of interaction between the network elements. It may be understood that to implement the foregoing functions, the network elements such as the apparatus for reporting a PHR and the apparatus for obtaining a PHR include corresponding hardware structures and/or software modules for performing the functions. A person skilled in the art should easily be aware that, in combination with units and algorithm steps of the examples described in the embodiments disclosed in this specification, this application can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, function unit division may be performed on the apparatus for reporting a PHR and the apparatus for obtaining a PHR based on the foregoing method examples. For example, each functional unit may be obtained through division based on a corresponding function, or two or more functions may be integrated into one processing unit. The foregoing integrated unit may be implemented in a form of hardware, or may be implemented in a form of a software functional unit. It should be noted that, in the embodiments of this application, unit division is an example, and is merely logical function division. In actual implementation, another division manner may be used.

The foregoing describes the methods in the embodiments of this application with reference to FIG. 8 to FIG. 16. The following describes an apparatus for reporting a PHR and an apparatus for obtaining a PHR that are provided in the embodiments of this application and that perform the foregoing methods. A person skilled in the art may understand that the method and the apparatus may be combined and referenced with each other. The apparatus for reporting a PHR provided in the embodiments of this application may perform the foregoing method for reporting a PHR that is, the step performed by the first terminal. The apparatus for obtaining a PHR may perform the method for obtaining a PHR in the foregoing embodiments, that is, the step performed by the network device.

Figure 17:
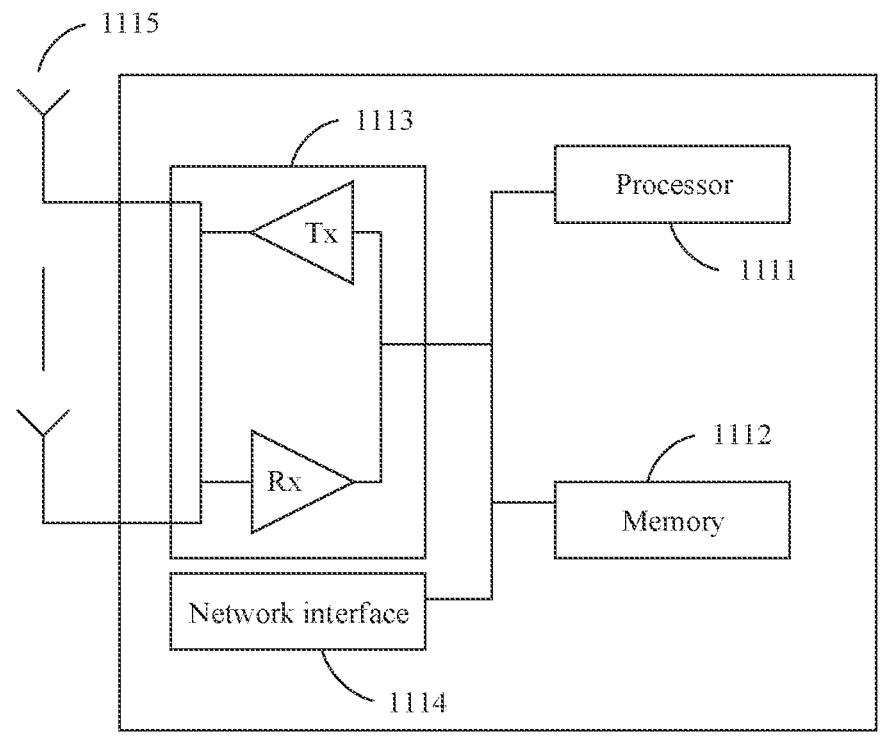
FIG. 17 is a schematic structural diagram 1 of a base station according to an embodiment of this application.

FIG. 17 is a schematic structural diagram of a base station. For a structure of a network device, refer to the structure shown in FIG. 17.

The base station includes at least one processor 1111, at least one memory 1112, at least one transceiver 1113, at least one network interface 1114, and one or more antennas 1115. The processor 1111, the memory 1112, the transceiver 1113, and the network interface 1114 are connected by using, for example, a bus. The antenna 1115 is connected to the transceiver 1113. The network interface 1114 is configured to enable the base station to be connected to another communications device through a communications link. For example, the base station is connected to a network element of a core network through an S interface/NG interface. In this embodiment of this application, the connection may include various types of interfaces, transmission lines, buses, or the like. This is not limited in this embodiment.

In this embodiment of this application, the processor such as the processor 1111 may include at least one of the following types: a general-purpose central processing unit (CPU), a digital signal processor (DSP), a microprocessor, an application-specific integrated circuit (ASIC), a microcontroller unit (MCU), a field-programmable gate array (FPGA), or an integrated circuit configured to implement a logical operation. For example, the processor 1111 may be a single-core (single-CPU) processor or a multi-core (multi-CPU) processor. The at least one processor 1111 may be integrated into one chip or located on a plurality of different chips.

In this embodiment of this application, the memory such as the memory 1112 may include at least one of the following types: a read-only memory (ROM) or another type of static storage device that can store static information and instructions, a random access memory (RAM) or another type of dynamic storage device that can store information and instructions, or an electrically erasable programmable read-only memory (EEPROM). In some scenarios, the memory may alternatively be a compact disc read-only memory (CD-ROM) or another compact disc storage, an optical disc storage (including a compact disc, a laser disc, an optical disc, a digital versatile disc, a Blu-ray disc, and the like), a magnetic disk storage medium or another magnetic storage device, or any other medium that can be configured to carry or store expected program code in a form of instructions or a data structure and that can be accessed by a computer. However, the memory is not limited herein.

The memory 1112 may exist independently, and is connected to the processor 1111. Optionally, the memory 1112 and the processor 1111 may alternatively be integrated together, for example, integrated into a chip. The memory 1112 can store program code for executing the technical solutions in the embodiments of this application, and the processor 1111 controls execution of the program code. Various types of executed computer program code may also be considered as drivers of the processor 111. For example, the processor 1111 is configured to execute the computer program code stored in the memory 1112, to implement the technical solutions in the embodiments of this application.

The transceiver 1113 may be configured to support receiving or sending of a radio frequency signal between the base station and a first terminal, and the transceiver 1113 may be connected to the antenna 1115. The transceiver 1113 includes a transmitter Tx and a receiver Rx. Specifically, the one or more antennas 1115 may receive a radio frequency signal. The receiver Rx of the transceiver 1113 is configured to: receive the radio frequency signal from the antennas, convert the radio frequency signal into a digital baseband signal or a digital intermediate frequency signal, and provide the digital baseband signal or the digital intermediate frequency signal for the processor 1111, so that the processor 1111 further processes the digital baseband signal or the digital intermediate frequency signal, for example, performs demodulation processing and decoding processing. In addition, the transmitter Tx of the transceiver 1113 is further configured to: receive a modulated digital baseband signal or digital intermediate frequency signal from the processor 1111, convert the modulated digital baseband signal or digital intermediate frequency signal into a radio frequency signal, and send the radio frequency signal through the one or more antennas 1115. Specifically, the receiver Rx may selectively perform one or more levels of frequency down-mixing processing and analog-to-digital conversion processing on the radio frequency signal to obtain the digital baseband signal or the digital intermediate frequency signal. A sequence of the frequency down-mixing processing and the analog-to-digital conversion processing is adjustable. The transmitter Tx may selectively perform one or more levels of frequency up-mixing processing and digital-to-analog conversion processing on the modulated digital baseband signal or digital intermediate frequency signal to obtain the radio frequency signal. A sequence of the frequency up-mixing processing and the digital-to-analog conversion processing is adjustable. The digital baseband signal and the digital intermediate frequency signal may be collectively referred to as a digital signal.

In a possible implementation, for example, the method performed by the network device in the embodiments of this application may be performed by the network device in a structure shown in FIG. 17, a sending or receiving action of the network device may be completed by the processor 1111 of the base station shown in FIG. 17 through the antenna 1115, and an action such as determining or processing of the network device may be completed by the processor 1111 of the base station shown in FIG. 17. For example, the processor 1111 of the base station may send first signaling to the first terminal through the antenna 1115. For example, the processor 111 receives at least one of a first PHR and a second PHR through the receiver in the transceiver, or receives a third PHR and at least one of the following PHRs: a first PHR and a second PHR through the receiver in the transceiver.

Figure 18:
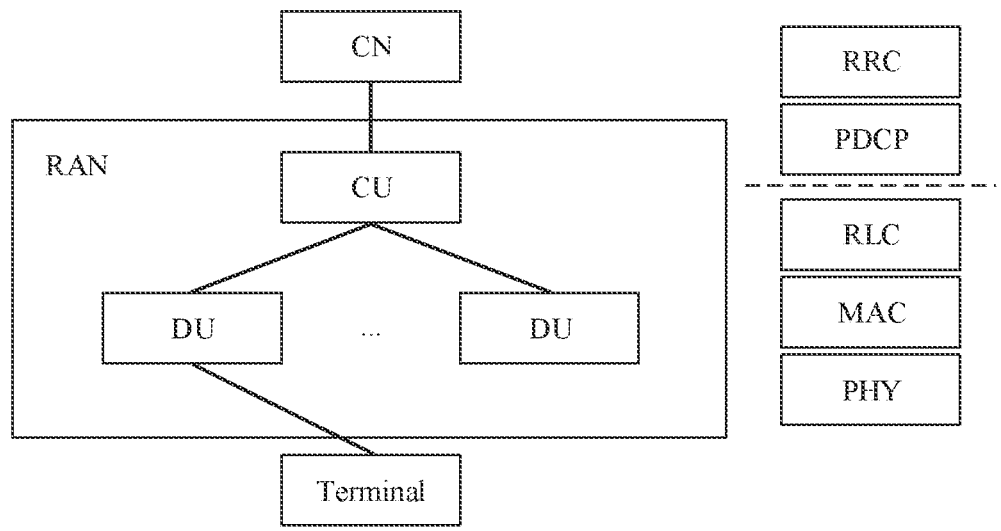
FIG. 18 is a schematic structural diagram 2 of a base station according to an embodiment of this application.

A future base station may be implemented by using a cloud radio access network (C-RAN) architecture. Therefore, in a possible manner, an architecture and a function of a protocol stack of a conventional base station are divided into two parts: One part is referred to as a central unit (CU), and the other part is referred to as a distributed unit (DU). As shown in FIG. 18, CU parts of a plurality of base stations are integrated together to form a relatively large-scale functional entity. A plurality of DUs may be controlled by one CU in a centralized manner. As shown in FIG. 18, the CU and the DU may be obtained based on division of protocol layers of a wireless network. For example, functions of a packet data convergence protocol (PDCP) layer and a protocol layer (for example, radio resource control (RRC)) above the PDCP layer are set on the CU. Functions of a protocol layer below the PDCP, for example, radio link control (RLC), a media access control (MAC) layer, and a physical layer (PHY), are set on the DU.

It may be understood that the division of the protocol layers shown in FIG. 18 is merely an example, and may alternatively be performed at other protocol layers. For example, the division is performed at the RLC layer. Functions of the RLC layer and a protocol layer above the RLC layer are set on the CU, and functions of a protocol layer below the RLC layer are set on the DU. Alternatively, the division is performed at a protocol layer. For example, a part of functions of the RLC layer and functions of a protocol layer above the RLC layer are set on the CU, and a remaining function of the RLC layer and functions of a protocol layer below the RLC layer are set on the DU. In addition, division may alternatively be performed in another manner, for example, the division is performed based on a latency. A function whose processing time needs to meet a latency requirement is set on the DU, and a function whose processing time does not need to meet the latency requirement is set on the CU. This is not limited in this embodiment of this application.

Figure 19:
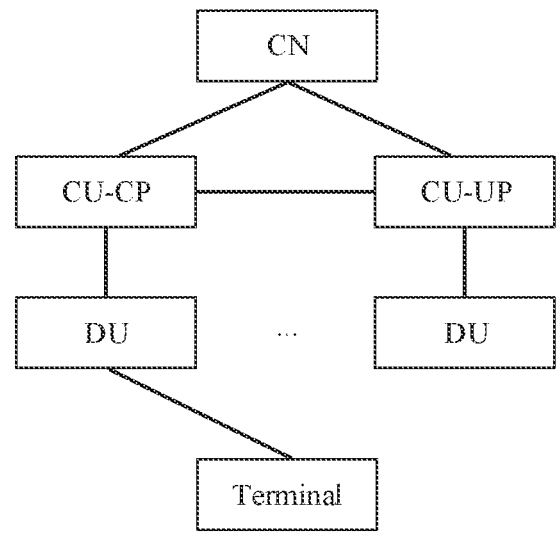
FIG. 19 is a schematic structural diagram 3 of a base station according to an embodiment of this application.

In addition, continue to refer to FIG. 19. Compared with the architecture shown in FIG. 18, a control plane (CP) and a user plane (UP) of a CU may be further separated and implemented by dividing the CU into different entities. The entities are separately a control plane CU entity (CU-CP entity) and a user plane CU entity (CU-UP entity).

In the foregoing network architecture, data generated by the CU may be sent to a terminal through the DU. Alternatively, data generated by a terminal may be sent to the CU through the DU. The DU may directly encapsulate the data at a protocol layer and then transmit encapsulated data to the terminal or the CU, without parsing the data. For example, data at an RRC layer or a PDCP layer is finally processed as data at a physical layer (physical layer, PHY) and sent to the terminal, or is converted from received data at a PHY layer. In this architecture, the data at the RRC layer or the PDCP layer may also be considered to be sent by the DU.

In the foregoing embodiment, the CU belongs to a base station in a RAN. In addition, the CU may alternatively belong to a base station in a core network (CN). This is not limited herein.

An apparatus in the following embodiments of this application may be located in the terminal or the base station based on functions implemented by the apparatus. When the foregoing CU-DU structure is used, the base station may be a CU node, a DU node, or a RAN device including functions of a CU node and a DU node.

Figure 20:
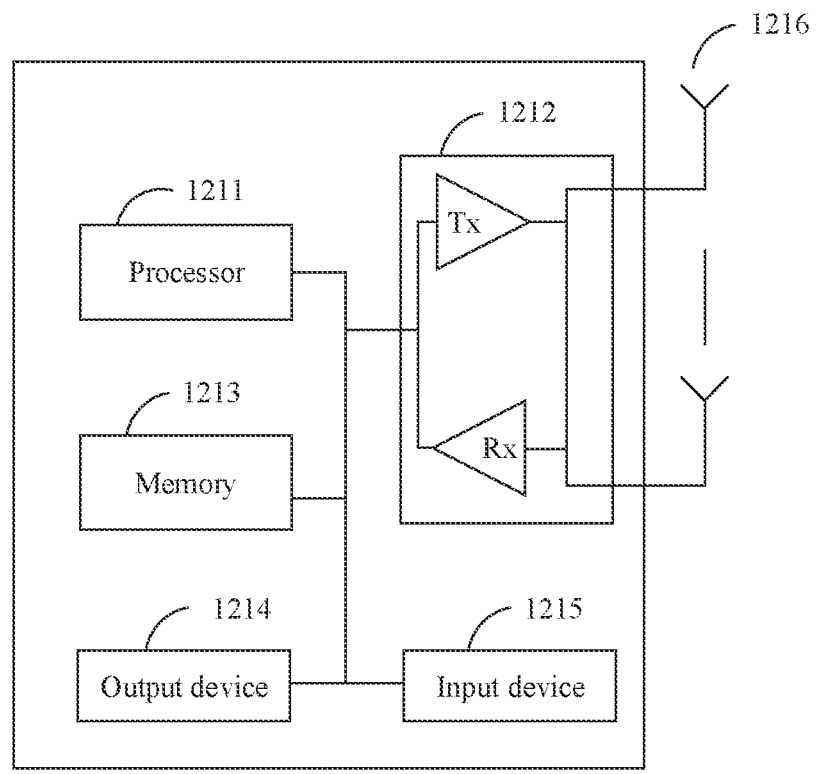
FIG. 20 is a schematic structural diagram of a terminal according to an embodiment of this application.

FIG. 20 is a schematic structural diagram of a terminal according to an embodiment of this application. For a structure of a first terminal 102, refer to the structure shown in FIG. 20.

The terminal includes at least one processor 1211, at least one transceiver 1212, and at least one memory 1213. The processor 1211, the memory 1213, and the transceiver 1212 are connected. Optionally, the terminal 121 may further include an output device 1214, an input device 1215, and one or more antennas 1216. The antenna 1216 is connected to the transceiver 1212, and the output device 1214 and the input device 1215 are connected to the processor 1211.

For the transceiver 1212, the memory 1213, and the antenna 1216, refer to the related descriptions in FIG. 17, to implement a similar function.

The processor 1211 may be a baseband processor, or may be a CPU. The baseband processor and the CPU may be integrated or separated.

The processor 1211 may be configured to implement various functions for the terminal, for example, configured to process a communication protocol and communication data, or configured to: control the entire terminal device, execute a software program, and process data of the software program, or configured to assist in completing a computing processing task, for example, graphics and image processing or audio processing. Alternatively, the processor 1211 is configured to implement one or more of the foregoing functions.

The output device 1214 communicates with the processor 1211, and may display information in a plurality of manners. For example, the output device 1214 may be a liquid crystal display (LCD), a light emitting diode (LED) display device, a cathode ray tube (CRT) display device, or a projector. The input device 1215 communicates with the processor 1211, and may receive an input of a user in a plurality of manners. For example, the input device 1215 may be a mouse, a keyboard, a touchscreen device, or a sensing device.

In a possible implementation, for example, the method performed by the first terminal in the embodiments of this application may be performed by the first terminal in a structure shown in FIG. 20, a sending or receiving action of the first terminal may be completed by the processor 1211 of the first terminal through the antenna 1216, and an action such as determining or processing of the first terminal may be completed by the processor 1211 of the first terminal. For example, the processor 1211 of the first terminal may receive, from a network device through the antenna 1216, first signaling sent by the network device. The processor 1211 of the first terminal may support the first terminal in performing step 101. For example, the processor 1211 of the first terminal performs step 102 through the antenna 1216. For example, the processor 1211 of the first terminal performs step 105, step 106, step 107, and step 108.

In addition, in the embodiments of this application, for each step in the method performed by the network device, the network device has a unit or a module for performing each step in the method, for each step in the method performed by the first terminal, the first terminal has a unit or a module for performing each step in the method.

An example in which each functional module is obtained through division based on each corresponding function is used below for description.

Figure 21:
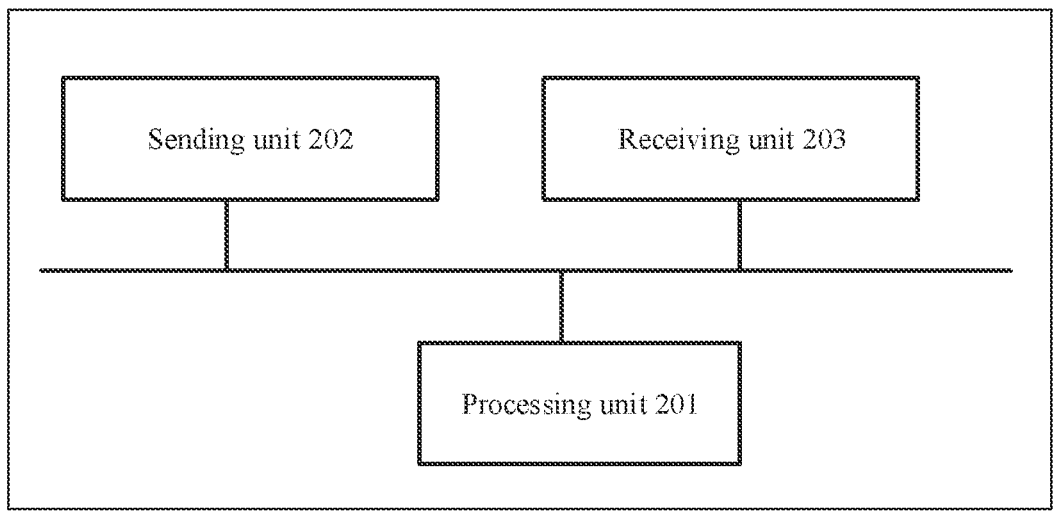
FIG. 21 is a schematic structural diagram 1 of an apparatus for reporting a PHR according to an embodiment of this application.

FIG. 21 is a schematic structural diagram of an apparatus for reporting a PHR according to an embodiment of this application. The apparatus for reporting a PHR may be the first terminal in the embodiments of this application, or may be a chip used in the first terminal.

The apparatus for reporting a PHR includes a processing unit 201 and a sending unit 202. The processing unit 201 is configured to support the apparatus for reporting a PHR in performing step 101, step 105, step 106, step 107, and step 108 in the foregoing embodiments. The sending unit 202 is configured to support the apparatus for reporting a PHR in performing step 102 in the foregoing embodiments.

Optionally, the apparatus for reporting a PHR may further include a receiving unit 203, configured to support the apparatus for reporting a PHR in performing step 104 in the foregoing embodiments.

All related content of the steps in the foregoing method embodiments may be cited in function descriptions of the corresponding functional modules. Details are not described herein again.

Optionally, the apparatus for reporting a PHR may further include a storage unit, configured to store signaling, data or computer program code.

Based on implementation by using hardware, the sending unit 202 in this application may be a transmitter of the first terminal or the chip used in the first terminal, and the receiving unit 203 may be a receiver of the first terminal or the chip used in the first terminal. The transmitter and the receiver may be usually integrated together and used as a transceiver. Specifically, the transceiver may also be referred to as a communications interface or a transceiver circuit. The processing unit 201 may be integrated into a processor of the first terminal or the chip used in the first terminal.

Figure 22:
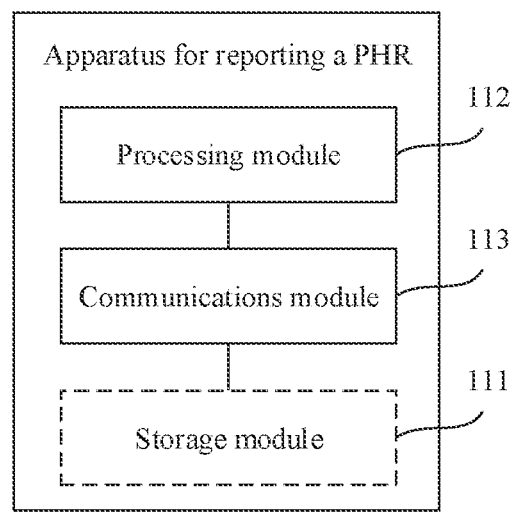
FIG. 22 is a schematic structural diagram 2 of an apparatus for reporting a PHR according to an embodiment of this application.

When an integrated unit is used, FIG. 22 is a possible schematic logical structural diagram of the apparatus for reporting a PHR in the foregoing embodiment. The apparatus for reporting a PHR may be a first terminal or a chip used in the first terminal, and the apparatus for reporting a PHR includes a processing module 112 and a communications module 113.

The processing module 112 is configured to control and manage an action of the apparatus for reporting a PHR. For example, the processing module 112 is configured to perform a step of processing a message or data on a side of the apparatus for reporting a PHR. For example, the processing module 112 is configured to support the apparatus for reporting a PHR in performing step 101, step 105, step 106, step 107, and step 108 in the foregoing embodiments. The communications module 113 is configured to support the apparatus for reporting a PHR in performing S102 and S104 in the foregoing embodiments, and/or another process that is performed by the apparatus for reporting a PHR and used for the technology described in this specification. Optionally, the apparatus for reporting a PHR may further include a storage module 111, configured to store program code and data of the apparatus for reporting a PHR.

The processing module 112 may be a processor or a controller, for example, may be a central processing unit, a general-purpose processor, a digital signal processor, an application-specific integrated circuit, a field-programmable gate array or another programmable logic device, a transistor logic device, a hardware component, or any combination thereof. The processing module 112 may implement or execute various example logical blocks, modules, and circuits described with reference to content disclosed in the present invention. Alternatively, the processor may be a combination of processors implementing a computing function, for example, a combination of one or more microprocessors or a combination of a digital signal processor and a microprocessor. The communications module 113 may be a transceiver, a transceiver circuit, a communications interface, or the like. The storage module 111 may be a memory.

When the processing module 112 is the processor 1211, the communications module 113 is the communications interface or the transceiver 1212, and the storage module 111 is the memory 1213, the apparatus for reporting a PHR in this application may be the device shown in FIG. 20.

Figure 23:
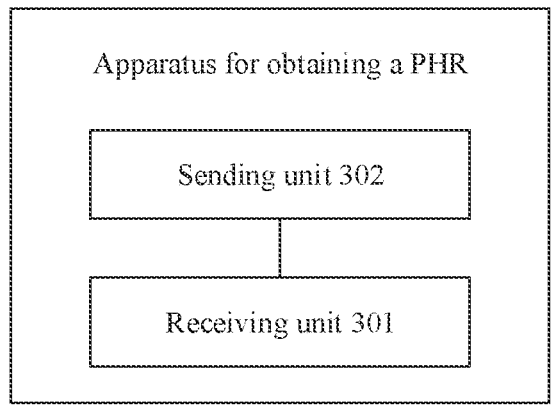
FIG. 23 is a schematic structural diagram 1 of an apparatus for obtaining a PHR according to an embodiment of this application.

FIG. 23 is a schematic structural diagram of an apparatus for obtaining a PHR according to an embodiment of this application. The apparatus for obtaining a PHR may be a network device in the embodiments of this application, or may be a chip used in a network device.

The network device includes a receiving unit 301. The receiving unit 301 is configured to support the apparatus for obtaining a PHR in performing step 103 in the foregoing embodiments.

Optionally, the network device may further include a sending unit 302, configured to support the apparatus for obtaining a PHR in performing step S104a. Alternatively, the network device may further include a processing unit, configured to adjust resource allocation for the first terminal based on at least one of a first PHR, a second PHR, or a third PHR.

Figure 24:
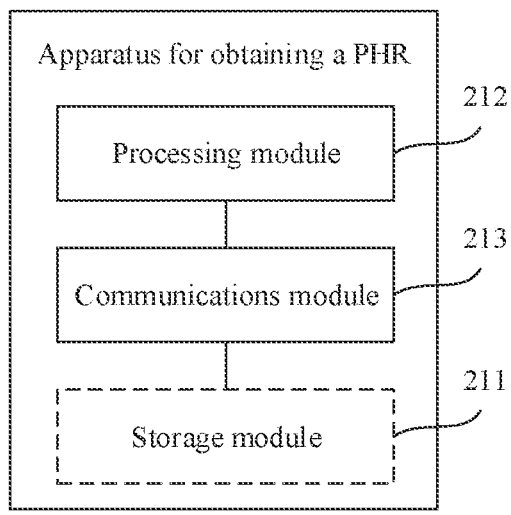
FIG. 24 is a schematic structural diagram 2 of an apparatus for obtaining a PHR according to an embodiment of this application.

When an integrated unit is used, FIG. 24 is a possible schematic structural diagram of the apparatus for obtaining a PHR in the foregoing embodiment. The apparatus for obtaining a PHR may be a network device or a chip used in a network device. The apparatus for obtaining a PHR includes a processing module 212 and a communications module 213. The processing module 212 is configured to control and manage an action of the apparatus for obtaining a PHR. For example, the processing module 212 is configured to support the apparatus for obtaining a PHR in performing a message or data processing operation on a side of the apparatus for obtaining a PHR in the foregoing embodiments. The communications module 213 is configured to support the apparatus for obtaining a PHR in performing message or data receiving and sending operations on the side of the apparatus for obtaining a PHR in the foregoing embodiments, for example, step 103 in the foregoing embodiments, and/or another process that is performed by the apparatus for obtaining a PHR and used for the technology described in this specification.

Optionally, the apparatus for obtaining a PHR may further include a storage module 211, configured to store program code and data of the apparatus for obtaining a PHR.

The processing module 212 may be a processor or a controller, for example, may be a central processing unit, a general-purpose processor, a digital signal processor, an application-specific integrated circuit, a field-programmable gate array or another programmable logic device, a transistor logic device, a hardware component, or any combination thereof. The processing module 212 may implement or execute various example logical blocks, modules, and circuits described with reference to content disclosed in the present invention. Alternatively, the processor may be a combination of processors implementing a computing function, for example, a combination of one or more microprocessors or a combination of a digital signal processor and a microprocessor. The communications module 213 may be a transceiver, a transceiver circuit, a communications interface, or the like. The storage module 211 may be a memory.

When the processing module 212 is the processor 1111, the communications module 213 is the communications interface or the transceiver 1113, and the storage module 211 is the memory 1112, the apparatus for obtaining a PHR in this application may be the device shown in FIG. 17.

Figure 25:
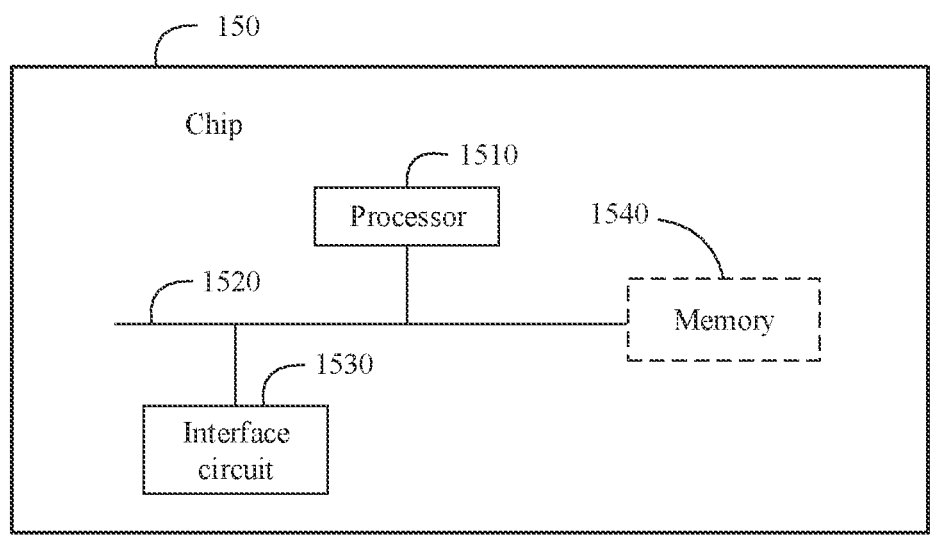
FIG. 25 is a schematic structural diagram of a chip according to an embodiment of this application.

FIG. 25 is a schematic structural diagram of a chip 150 according to an embodiment of the present invention. The chip 150 includes at least one processor 1510 and an interface circuit 1530.

Optionally, the chip 150 further includes a memory 1540. The memory 1540 may include a read-only memory and a random access memory, and provide operation instructions and data for the processor 1510. A part of the memory 1540 may further include a non-volatile random access memory (NVRAM).

In some implementations, the memory 1540 stores the following elements: an executable module or a data structure, or a subset thereof, or an extended set thereof.

In this embodiment of the present invention, a corresponding operation is performed by invoking the operation instructions stored in the memory 1540 (where the operation instructions may be stored in an operating system).

In a possible implementation, a structure of a chip used by a terminal is similar to a structure of a chip used by a network device, and different apparatuses may use different chips to implement respective functions.

The processor 1510 controls operations of the terminal and the network device, and the processor 1510 may also be referred to as a CPU (central processing unit). The memory 1540 may include a read-only memory and a random access memory, and provide instructions and data for the processor 1510. A part of the memory 1540 may further include a non-volatile random access memory (NVRAM). In a specific application, the processor 1510, the interface circuit 1530, and the memory 1540 are coupled together by using a bus system 1520. In addition to a data bus, the bus system 1520 may further include a power bus, a control bus, a status signal bus, and the like. However, for clear description, various types of buses in FIG. 25 are marked as the bus system 1520.

The method for reporting a power headroom report or the method for receiving a power headroom report disclosed in the foregoing embodiments of the present invention may be applied to the processor 1510, or may be implemented by the processor 1510. The processor 1510 may be an integrated circuit chip and has a signal processing capability. In an implementation process, the steps of the method for reporting a power headroom report or the method for receiving a power headroom report may be completed by using a hardware integrated logic circuit in the processor 1510 or instructions in a form of software. The processor 1510 may be a general-purpose processor, a digital signal processor (DSP), an application-specific integrated circuit (ASIC), a field-programmable gate array (FPGA) or another programmable logic device, a discrete gate or transistor logic device, or a discrete hardware component. The processor may implement or perform the methods, the steps, and logical block diagrams that are disclosed in the embodiments of the present invention. The general-purpose processor may be a microprocessor, or the processor may be any conventional processor or the like. The steps of the methods disclosed with reference to the embodiments of the present invention may be directly executed and accomplished by using a hardware decoding processor, or may be executed and accomplished by using a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory 1540, and the processor 1510 reads information in the memory 1540 and completes the steps in the foregoing methods in combination with hardware of the processor.

Optionally, the interface circuit 1530 is configured to perform receiving and sending steps of the first terminal and the network device in the embodiments shown in FIG. 8, FIG. 9, FIG. 10, FIG. 12, FIG. 14, FIG. 15, and FIG. 16.

The processor 1510 is configured to perform processing steps of the first terminal and the network device in the embodiments shown in FIG. 8, FIG. 9, FIG. 10, FIG. 12, FIG. 14, FIG. 15, and FIG. 16.

In the foregoing embodiment, the instructions that are stored in the memory and that are to be executed by the processor may be implemented in a form of a computer program product. The computer program product may be written into the memory in advance, or may be downloaded in a form of software and installed in the memory.

The computer program product includes one or more computer instructions. When the computer program instructions are loaded and executed on a computer, the procedure or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive solid state disk, SSD), or the like.

According to one aspect, a computer storage medium is provided. The computer-readable storage medium stores instructions. When the instructions are run, a first terminal or a chip used in a first terminal is enabled to perform step 101, step 102, step 104, step 105, step 106, step 107, and step 108 in the embodiments, and/or another process that is performed by the first terminal or the chip used in the first terminal and used for the technology described in this specification. The foregoing readable storage medium may include: any medium that can store program code, such as a USB flash drive, a removable hard disk, a read-only memory, a random access memory, a magnetic disk, or an optical disc.

According to another aspect, a computer storage medium is provided. The computer-readable storage medium stores instructions. When the instructions are run, a network device or a chip used in a network device is enabled to perform step 103 and step S104*a* in the embodiments, and/or another process that is performed by the network device or the chip used in the network device and used for the technology described in this specification.

According to one aspect, a computer program product including instructions is provided. The computer program product stores the instructions. When the instructions are run, a first terminal or a chip used in a first terminal is enabled to perform step 101, step 102, step 104, step 105, step 106, step 107, and step 108 in the embodiments, and/or another process that is performed by the first terminal or the chip used in the first terminal and used for the technology described in this specification.

According to another aspect, a computer program product including instructions is provided. The computer program product stores the instructions. When the instructions are run, a network device or a chip used in a network device is enabled to perform step 103 and step S104*a* in the embodiments, and/or another process that is performed by the network device or the chip used in the network device and used for the technology described in this specification.

According to one aspect, a chip is provided. The chip is used in a first terminal, and the chip includes at least one processor and an interface circuit. The interface circuit is interconnected to the at least one processor by using a line, and the processor is configured to run instructions, to perform step 101, step 102, step 104, step 105, step 106, step 107, and step 108 in the embodiments, and/or another process that is performed by the first terminal and used for the technology described in this specification.

According to another aspect, a chip is provided. The chip is used in a network device, and the chip includes at least one processor and an interface circuit. The interface circuit is interconnected to the at least one processor by using a line, and the processor is configured to run instructions, to perform step 103 and step S104a in the embodiments, and/or another process that is performed by the network device and used for the technology described in this specification.

According to still another aspect, this application provides a communications system. The communications system includes the apparatus for reporting a PHR shown in any one of FIG. 20, FIG. 21, and FIG. 22, and the apparatus for obtaining a PHR shown in any one of FIG. 17, FIG. 23, and FIG. 24.

Although this application is described with reference to specific features and the embodiments thereof, clearly, various modifications and combinations may be made to them without departing from the spirit and scope of this application. Correspondingly, the specification and accompanying drawings are merely example description of this application defined by the appended claims, and are considered as any of or all modifications, variations, combinations or equivalents that cover the scope of this application. Clearly, a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A method for reporting a power headroom report, comprising:
   calculating, by a first terminal, at least one of a first power headroom report (PHR) or a second power headroom report (PHR), wherein:
      the first PHR is a power headroom report of the first terminal on a first transmission link, wherein the first transmission link is a wireless communication link between the first terminal and a second terminal,
      the second PHR is a total power headroom report of the first terminal on the first transmission link and a second transmission link, wherein the second transmission link is a wireless communication link between the first terminal and a network device, and frequency division multiplexing (FDM) is performed on part of transmission resources of the first transmission link and part of transmission resources of the second transmission link;
   sending, by the first terminal, the at least one of the first PHR or the second PHR;
   determining that a value of the second PHR is less than or equal to a first threshold; and
   in response to determining that the value of the second PHR is less than or equal to the first threshold, reducing, by the first terminal, a bandwidth of the first transmission link to enable FDM to be performed on the part of transmission resources of the first transmission link and the part of transmission resources of the second transmission link, wherein the bandwidth of the first transmission link comprises a bandwidth for information transmission on the first transmission link.

2. The method according to claim 1, wherein the second PHR is determined based on a first maximum transmit power, a first transmit power, and a second transmit power, wherein the first transmit power is a transmit power of the first terminal on the first transmission link, and the second transmit power is a transmit power of the first terminal on the second transmission link.

3. The method according to claim 2, wherein:
   the first maximum transmit power is a maximum transmit power of the first terminal; or
   the first maximum transmit power is determined based on a maximum transmit power of the first terminal on the first transmission link and a maximum transmit power of the first terminal on the second transmission link.

4. The method according to claim 1, wherein:
   when the first terminal does not send information on the first transmission link, the first PHR is determined based on a maximum virtual transmit power on the first transmission link and an open-loop power control parameter; and
   when the first terminal does not send information on the first transmission link and the first terminal does not send information on the second transmission link, the second PHR is determined based on a first maximum virtual transmit power, a virtual transmit power on the first transmission link, and a virtual transmit power on the second transmission link, wherein:
      the first maximum virtual transmit power is a maximum virtual transmit power of the first terminal; or
      the first maximum virtual transmit power is determined based on a maximum virtual transmit power of the first terminal on the first transmission link and a maximum virtual transmit power of the first terminal on the second transmission link.

5. The method according to claim 1, wherein the method further comprises:
   receiving, by the first terminal, first signaling, wherein:
      the first signaling is used to trigger reporting of the at least one of the first PHR or the second PHR; or
      the first signaling is used to trigger reporting of a third PHR and at least one of the following PHRs: the first PHR or the second PHR, wherein the third PHR is a PHR of the first terminal on the second transmission link.

6. The method according to claim 1, further comprising:
   when a preset condition is met,
      reporting, by the first terminal, the at least one of the first PHR or the second PHR, or
      reporting, by the first terminal, a third PHR and at least one of the following PHRs: the first PHR or the second PHR, wherein: the preset condition comprises that a prohibit timer expires and one of the following: a sidelink resource set is switched, the sidelink resource set is reconfigured, and the first terminal does not use a sidelink maximum transmit power to send information on the first transmission link, wherein the sidelink resource set is used to transmit information sent on the first transmission link.

7. The method according to claim 1, wherein the sending, by the first terminal, the at least one of the first PHR or the second PHR comprises:
   sending, by the first terminal, second signaling and third signaling, wherein the second signaling carries the first PHR and a first identifier, the third signaling carries the second PHR and a second identifier, the first identifier is used to identify the first PHR, and the second identifier is used to identify the second PHR.

8. The method according to claim 7, further comprising:
when two or more of the first PHR, the second PHR, or a third PHR are triggered, reporting, by the first terminal, a PHR with a highest priority in triggered PHRs based on a priority of the first PHR, a priority of the second PHR, and a priority of the third PHR.

9. A method for obtaining a power headroom report, comprising:
receiving, by a network device, at least one of a first power headroom report (PHR) or a second PHR from a first terminal, wherein:
the first PHR is a power headroom report of the first terminal on a first transmission link, and the first transmission link is a wireless communication link between the first terminal and a second terminal;
the second PHR is a total power headroom report of the first terminal on the first transmission link and a second transmission link, the second transmission link is a wireless communication link between the first terminal and the network device, and frequency division multiplexing (FDM) is performed on part of transmission resources of the first transmission link and part of transmission resources of the second transmission link; and
when a value of the second PHR is less than or equal to a first threshold, a bandwidth of the first transmission link enables FDM to be performed on the part of transmission resources of the first transmission link and the part of transmission resources of the second transmission link, and the bandwidth of the first transmission link comprises a bandwidth used to transmit information on the first transmission link.

10. The method according to claim 9, wherein the second PHR is determined based on a first maximum transmit power, a first transmit power, and a second transmit power, the first transmit power is a transmit power of the first terminal on the first transmission link, and the second transmit power is a transmit power of the first terminal on the second transmission link.

11. An apparatus for reporting a power headroom report, comprising:
one or more processors; and
a non-transitory computer readable medium storing a program to be executed by the one or more processors, wherein the program comprises instructions that cause the apparatus to perform operations comprising:
calculating at least one of a first power headroom report (PHR) or a second power headroom report (PHR), wherein
the first PHR is a power headroom report of a first terminal on a first transmission link, the first transmission link is a wireless communication link between the first terminal and a second terminal,
the second PHR is a total power headroom report of the first terminal on the first transmission link and a second transmission link, the second transmission link is a wireless communication link between the first terminal and a network device, and frequency division multiplexing (FDM) is performed on part of transmission resources of the first transmission link and part of transmission resources of the second transmission link;
sending the at least one of the first PHR or the second PHR;

determining that a value of the second PHR is less than or equal to a first threshold; and
in response to determining that the value of the second PHR is less than or equal to the first threshold, reducing, by the first terminal, a bandwidth of the first transmission link to enable FDM to be performed on the part of transmission resources of the first transmission link and the part of transmission resources of the second transmission link, wherein the bandwidth of the first transmission link comprises a bandwidth for information transmission on the first transmission link.

12. The apparatus according to claim 11, wherein the second PHR is determined based on a first maximum transmit power, a first transmit power, and a second transmit power, the first transmit power is a transmit power of the first terminal on the first transmission link, and the second transmit power is a transmit power of the first terminal on the second transmission link.

13. The apparatus according to claim 12, wherein:
the first maximum transmit power is a maximum transmit power of the first terminal; or
the first maximum transmit power is determined based on a maximum transmit power of the first terminal on the first transmission link and a maximum transmit power of the first terminal on the second transmission link.

14. The apparatus according to claim 11, wherein the operations further comprise:
when the first terminal does not send information on the first transmission link, determining the first PHR based on a maximum virtual transmit power on the first transmission link and an open-loop power control parameter; and
when the first terminal does not send information on the first transmission link and the first terminal does not send information on the second transmission link, determining the second PHR based on a first maximum virtual transmit power, a virtual transmit power on the first transmission link, and a virtual transmit power on the second transmission link, wherein the first maximum virtual transmit power is a maximum virtual transmit power of the first terminal, or the first maximum virtual transmit power is determined based on a maximum virtual transmit power of the first terminal on the first transmission link and a maximum virtual transmit power of the first terminal on the second transmission link.

15. The apparatus according to claim 11, wherein the operations further comprise:
receiving first signaling, wherein:
the first signaling is used to trigger reporting of the at least one of the first PHR or the second PHR, or
the first signaling is used to trigger reporting of a third PHR and at least one of the following PHRs: the first PHR or the second PHR, and wherein the third PHR is a PHR of the first terminal on the second transmission link.

16. The apparatus according to claim 11, wherein the operations further comprise:
when a preset condition is met, reporting the at least one of the first PHR or the second PHR, or reporting a third PHR and at least one of the following PHRs: the first PHR or the second PHR, wherein:
the preset condition comprises that a prohibit timer expires and one of the following: a sidelink resource set is switched, the sidelink resource set is reconfigured, and the first terminal does not use a sidelink maximum transmit power to send information on the first transmission link, wherein the sidelink resource set is used to transmit information sent on the first transmission link.

17. The apparatus according to claim 11, wherein sending the at least one of the first PHR or the second PHR comprises:
sending second signaling and third signaling, wherein the second signaling carries the first PHR and a first identifier, the third signaling carries the second PHR and a second identifier, the first identifier is used to identify the first PHR, and the second identifier is used to identify the second PHR.

18. The apparatus according to claim 17, wherein the operations further comprise:
when two or more of the first PHR, the second PHR, or a third PHR are triggered, reporting a PHR with a highest priority in triggered PHRs based on a priority of the first PHR, a priority of the second PHR, and a priority of the third PHR.

19. An apparatus for obtaining a power headroom report, comprising:
one or more processors; and
a non-transitory computer readable medium storing a program to be executed by the one or more processors, wherein the program comprises instructions that cause the apparatus to perform operations comprising:
receiving at least one of a first power headroom report (PHR) or a second PHR from a first terminal, wherein:
the first PHR is a power headroom report of the first terminal on a first transmission link, and the first transmission link is a wireless communication link between the first terminal and a second terminal;
the second PHR is a total power headroom report of the first terminal on the first transmission link and a second transmission link, the second transmission link is a wireless communication link between the first terminal and a network device, and frequency division multiplexing (FDM) is performed on part of transmission resources of the first transmission link and part of transmission resources of the second transmission link; and
when a value of the second PHR is less than or equal to a first threshold, a bandwidth of the first transmission link enables FDM to be performed on the part of transmission resources of the first transmission link and the part of transmission resources of the second transmission link, and the bandwidth of the first transmission link comprises a bandwidth used to transmit information on the first transmission link.

20. The apparatus according to claim 19, wherein the second PHR is determined based on a first maximum transmit power, a first transmit power, and a second transmit power, the first transmit power is a transmit power of the first terminal on the first transmission link, and the second transmit power is a transmit power of the first terminal on the second transmission link.

* * * * *